US007664664B2

(12) United States Patent
King et al.

(10) Patent No.: US 7,664,664 B2
(45) Date of Patent: Feb. 16, 2010

(54) METHODS AND SYSTEMS FOR PORTFOLIO PLANNING

(75) Inventors: Nigel King, San Mateo, CA (US); Alison Schofield, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1190 days.

(21) Appl. No.: 10/422,390

(22) Filed: Apr. 23, 2003

(65) Prior Publication Data
US 2004/0230468 A1   Nov. 18, 2004

(51) Int. Cl.
*G06Q 10/00* (2006.01)
(52) U.S. Cl. .......................................................... 705/7
(58) Field of Classification Search .................. 705/7–9
See application file for complete search history.

(56) References Cited

U.S. PATENT DOCUMENTS

| 5,208,765 | A | * | 5/1993 | Turnbull ....................... 702/84 |
| 5,767,848 | A | * | 6/1998 | Matsuzaki et al. .......... 715/751 |
| 5,774,881 | A | | 6/1998 | Friend et al. |
| 5,864,875 | A | * | 1/1999 | Van Huben et al. ......... 707/200 |
| 6,032,121 | A | | 2/2000 | Dietrich et al. |
| 6,233,493 | B1 | | 5/2001 | Cherneff et al. |
| 6,282,514 | B1 | * | 8/2001 | Kumashiro ..................... 705/7 |
| 6,542,871 | B1 | * | 4/2003 | Harshaw ......................... 705/7 |
| 6,581,040 | B1 | * | 6/2003 | Wright et al. .................. 705/8 |
| 6,601,034 | B1 | * | 7/2003 | Honarvar et al. ............... 705/7 |
| 6,671,873 | B2 | | 12/2003 | Milobinski et al. |
| 6,862,585 | B2 | * | 3/2005 | Planalp et al. .................. 707/1 |
| 6,871,182 | B1 | * | 3/2005 | Winnard et al. ................ 705/7 |
| 6,928,418 | B2 | * | 8/2005 | Michaud et al. ........... 705/36 R |
| 2001/0032105 | A1 | * | 10/2001 | Frye et al. ....................... 705/7 |
| 2002/0052862 | A1 | * | 5/2002 | Scott et al. ..................... 707/1 |
| 2002/0059512 | A1 | * | 5/2002 | Desjardins ..................... 713/1 |
| 2002/0165744 | A1 | * | 11/2002 | Juras et al. ..................... 705/7 |
| 2003/0033191 | A1 | * | 2/2003 | Davies et al. ................. 705/10 |
| 2003/0135399 | A1 | * | 7/2003 | Ahamparam et al. ........... 705/7 |

OTHER PUBLICATIONS

McGrath, Michael; "Setting the PACE in Product Development", 1996, Elsevier, Butterworth-Heinemann, pp. 1-177.*
Eslampour, Bob; O'Donnell, Stephen; "Five Ways of Making Multi-Geographical Teams Work", Dec. 1996, PRTM Insight Magazine, pp. 1-3, www.prtm.com/insight/article.asp?insight_id=1622.*
Egger, Fritz P; Kleiner, Brian H: "New developments in product scheduling", Work Study, v41n3, pp. 17-19.*
Business Wire, "Development Chain Management —DCM- to revolutionize Strategic Product Development", Mar. 6, 2000.*

(Continued)

*Primary Examiner*—Jonathan G Sterrett
(74) *Attorney, Agent, or Firm*—Townsend and Townsend and Crew LLP

(57) ABSTRACT

Computer implemented methods provide a unified framework for the creation, evaluation and selection of requests for funding, of proposed projects and of proposed products within an enterprise. Processes enable the systematic gathering of assumptions that form the basis for generating proposals and project or product scenarios based upon changes in the assumptions. The generated scenarios may be evaluated against predefined criteria and predefined strategic objectives for the enterprise.

27 Claims, 17 Drawing Sheets

OTHER PUBLICATIONS

PR Newswire, "IDe Receives $12 million second-round Funding to Support Product Development Chain Management", Apr. 7, 2000, p. 2065.*

Business Wire, "PMG and IDe Launch Pioneering Performance Measurement Initiative for Web-enabled Product Development", May 1, 2000, p. 1587.*

Business Wire, "Chain Management (DCM) software. Idweb manages and improves investment", Mar. 6, 2000.*

Deck, Mark; Givert, Didier; Strom, Mark; "The Increasing Role of Deep Collaboration in Development—Strategy, Produces and Processes are Converging into Customer-Driven Value Chains", Spring 2000, PRTM's Insight Magazine, pp. 1-2.*

Lavallee, Ryan, "IDe's IDwebn™ Software supports PMI® PMBOK® Standards", copyright 2000 Integrated Development Enterprise, pp. 1-6, http://www.ide.com/pdfs/PMBOK.pdf.*

IDe.com website, "IDe: Welcome to IDe", Mar. 4, 2000, pp. 1-2, web.archive.org/web/20000304014944/www.ide.com/homepage.asp.*

PRTM Press Release, "IDe Introduces Executive Team to Lead Revolution to Web-Enable Product Development", Feb. 28, 2000, pp. 1-2, www.prtm.com/pressreleases/2000/02.28.asp.*

Business Wire, "Consultants PRTM and Software Company IDe Launch Global Alliance to Web-enable Product Development in High Tech Industry", Mar. 13, 2000, p. 0206.*

Business Wire, "Accelerating Innovation Processes to Web Speed is Theme of Worldwide Seminar Series", Mar. 30, 2000.*

Business Wire, Ide's Idweb 2.2 Enables Management of Strategic Product Development Projects with Increased Planning and Management Functionality, May 8, 2000, p. 1465.*

Walwyn, David R; Taylor, David; Brickhill, Glenn; "Application of the Jarrow and Turnbull Model to Risk Management and the Valuation of Intellectual Property Arising from Research and Development", SAIChE 2000 Meeting, pp. 1-14, retrieved from 111.cam.witz.ac.za/mfinance/papers,wtb_riskpaper.doc.*

Ratbe, Dina; King, William R.; Kim, Young-Gul; "The fit between project characteristics and application development methodologies: a contingency approach", Winter 1999-2000, Journal of Computer Information Systems, pp. 26.*

Cooper, Robert G; Kleinschmidt, Elko J; "New product performance: what distinguishes the star products", Jun. 2000, Australian Journal of Management, 25, 2, ABI/INFORM Global, p. 17.*

Jarrett, E.L.; "The Role of Risk in Business Decision-Making, or How to Stop Worrying and Love the Bombs", Research Technology Management, Nov./Dec. 2000; 43, 6; ABI/INFORM Global, p. 44.*

Hantos, Dr. Peter; "Software Estimation Experiences at Xerox", Oct. 24-27, 2000, 15th International Forum on COCOMO and Software Cost Modelling, pp. 1-20, retrieved from the web at sunset.usc.edu/Activities/oct24-27-00/Presentations/Hantos.pdf. (note p. 9).*

BusinessWire, "META Group invests in IMT Strategies, a Leading Sales and Marketing Advisory Firm", Jan. 7, 1999, New York p. 1, ProQuest ID 37855287.*

Donath, Bob; "ISBM Nuggets: New Product Development Consortium—Portfolio Management", Mar. 19, 2001, ISBM New Product Development Consortium, Philadelphia, PA, pp. 1-54.*

New product performance: What distinguishes the star products Robert G Cooper, Elko J Kleinschmidt. Australian Journal of Management. Sydney: Jun. 2000.vol. 25, Iss. 1; p. 17, 29 pgs.*

Maris Martinsonsa, Robert Davisonb, and Dennis Tsec, "The balanced scorecard: a foundation for the strategic management of information systems",Decision Support Systems, vol. 25, Issue 1, Feb. 1999, pp. 71-88.*

Rautiainen, K. Nissinen, M. Lassenius, C.,"Improving multi-project management in two product development organizations" System Sciences, 2000. Proceedings of the 33rd Annual Hawaii International Conference Publication Date: Jan. 4-7, 2000.*

Oracle Balanced Scorecard, User's Guide, Release 1.5 for MS Windows, Part No. A75381-01 (Oct. 1999).

Robert S. Kaplan and David P. Norton, "The Balanced Scorecard—Measures that Drive Performand", The Harvard Business Review, Product No. 4096 (Jan.-Feb. 1992).

* cited by examiner

| File | Edit | View | Go | Help |

Product Business Plan #: P5634212 — 202
Item Number: CP4320  Description: CP 4320 Inkjet Printer

Strategic Objectives: — Score Card Name / Score  [EDIT]
- Fast Follower for New Technologies — GROWTH — 5
- 206 Refiner of Key Technologies For Corp. Market — GROWTH — 6
- Quality Leader With Ack. Price Premium — GROWTH — 7

Market Assumptions

| Market Size | Unit | Growth | Window Open | Window Closed | Test Mkt ☐ |
|---|---|---|---|---|---|
| 50,000 | Each | 10% | 1/20/03 | 7/3/2003 | Sales Feedback ☐ |
| | | | | | Focus Group ☐ |

208

| Concentration | Unit Price | Volume | Revenue |
|---|---|---|---|
| 80% of market held by 5 companies | 10.00 | 50,000 | 500,000 |

[EDIT]

Competitors & Key Product Features

| Key Features | ABC Co. | Acme, Inc. | Smith Corp. | C2Neuve & Cie. | Young & Lee |
|---|---|---|---|---|---|
| Photo Quality Printing | + | + | - | + | - |
| Simul. Scan & Print | + | + | - | - | + |
| Image to Text Conv. | - | + | - | - | - |
| Duplex Capability | - | - | - | + | - |

210  [EDIT]

Revenue, COGS & Contribution

| Scenario | | Year 1 | Year 2 | Year 3 |
|---|---|---|---|---|
| | Sales Volume | 1,000 | 1,100 | 1,200 |
| 212 | Proposed Unit Price | 11.50 | 11.50 | 11.50 |
| | Estimated Unit Cost | 8.50 | 8.50 | 8.50 |
| | Sales Revenue | 11,500 | 12,650 | 13,800 |
| 204 | Cost of Goods Sold | 3,000 | 3,300 | 3,600 |
| | Contribution | 3,000 | 3,300 | 3,600 |
| | Contribution (%) | 26% | 26% | 26% |

[EDIT]

Development Project Information

| Project | Start Date | Work Days | Allocation | Best Cost | Likely Cost | Worst Cost |
|---|---|---|---|---|---|---|
| 1,000 | 1/20/2003 | 700 | 40% | 22,200 | 24,000 | 25,500 |

Financial Analysis  [EDIT]
- Net Present Value (NPV) — 15,000
- Investment Performance (NPV/Dollars Invested) — 68%
- 214 Internal Rate of Return (IRR) — 12%
- Payback Period (Years) — 1

[EDIT]

Resource Requirements

| Resource Type | Person Days | Headcount |
|---|---|---|
| Design Engineer | 600 | 10 |
| 216 Release Engineer | 100 | 2 |
| Total | 700 | 12 |

[EDIT]

Risk & Sensitivity

| Project Overrun | Overrun Days | Volume | Price | Cost |
|---|---|---|---|---|
| 10% | 50 | -20% | -5% | 5% |
| 218 50% | 250 | -40% | -20% | 10% |
| 100% | 500 | -60% | -40% | 15% |

[EDIT]

Prospects

| Customer ID | Name | Address |
|---|---|---|
| 1001 | Dick Wolf & Co. | 1234 Main Street, Anytown, CA |
| 220 1002 | Harry Enterprises | 5678 Second Street, Whereville, CA |

[EDIT]

Contacts

| Role | Name | Telephone |
|---|---|---|
| Product Manager | Joe Bloggs | 650-506-2314 |
| 222 Product Sponsor | Fred Smith | 650-506-7000 |

[EDIT]

Collateral

| Document Type | Document Name |
|---|---|
| Brochure | CP 4320 Inkjet Printer - Marketing Brochure (CP4320MB) |
| 224 Installation Manual | CP 4320 Inkjet Printer - Installation Manual (CP4320IM) |
| Support Manual | CP 4320 Inkjet Printer - Support Manual (CP4320SM) |

[EDIT]

Approvals

Approval Workflow: Standard Midsize Plan Approval WF  Override Approver: Jane Dough
226 Date Submitted: 09/03/2002
Date Approved:
Plan Status: Submitted

[EDIT]

*FIG. 2*

SETUP: RESOURCE TYPES
DEFINE RESOURCE TYPES

| Resource Type | Description | Expenditure Category | Headcount | Update Last update | Delete |
|---|---|---|---|---|---|
| Design Engineering | Design Eng. | Design Costs | 20 | 2/10/03 | — |
| Product Mgt | Product Mgt | Marketing Costs | 20 | 2/10/03 | — |
| Quality Engineering | Quality Eng | Quality Costs | 10 | 2/10/03 | — |
| Release Engineering | Release Eng | Release Costs | 20 | 2/10/03 | — |

FIG. 4

File  Edit  View  Go  Help http://www.......

Calendar

Resource Type

Project Types

Scope

Decay Profiles

Investment Criteria

SETUP: PROJECT TYPES

DEFINE PHASE DURATIONS: Define requirements for each resource type within each phase of the project Project Type:      ENHANCEMENT Project Template:  ENHANCEMENT PROJECT

| PROJECT PHASE | TOTAL EXPIRED DAYS |
|---|---|
| Requirements | 60 |
| Design | 34 |
| Development | 32 |
| Release | 26 |
| Total: | 152 |

LOG OFF                    EDIT RESOURCE REQUIREMENT    APPLY    CANCEL

*FIG. 5*

| File | Edit | View | Go | Help | http://www.......

SETUP: SCORECARD

Calendar
Resource Type
Scope
Decay Profiles
Investment Criteria

| STRATEGIC OBJECTIVE | WEIGHTING | UPDATE OBJECTIVES |
|---|---|---|
| Market Risk | 20 | |
| Market Fit | 10 | |
| Technology Risk | 30 | |
| Technology Fit | 20 | |
| Strategic Fit | 20 | |

CANCEL
APPLY
LOG OFF

*FIG. 6*

Proposed Project Portfolio Planning Cycle: Mid Yr. Forecast FY03  702   704  Portfolio: All Projects - Printer

| Project Num | Project Name | Project Description | Project Type | Manager | Scope | Start Date | Approval Status |
|---|---|---|---|---|---|---|---|
| 6758 | Speeder | New Wall-Mounted Plotter | New | J. Dough | Medium | 01/01/03 | Recommended |
| 6730 | Micro Spot | Size Reduction 600 dpi Uptake | Tech. Uptake | J. Dough | Large | 10/15/02 | Proposed |
| 6721 | Kenika | 140 ppm 4 Ream Storage | Product Enhancement | J. Dough | Medium | 11/01/02 | Recommended |
| 6773 | Scout | Compact A4 Design | Prod. Line Enhancement | J. Dough | Small | 10/01/02 | Approved |
| 6694 | Datalyth | Robust Small Entry Office Model | Prod. Line Extension | J. Dough | Medium | 10/01/02 | Recommended |
| 6743 | Green | Uptake of EPA Disposal Regs. | Tech Uptake | J. Dough | Small | 10/01/02 | Approved |
| 6711 | Splat | On Board 802 11b Wi Fi Uptake | Tech Uptake | J. Dough | Medium | 12/01/02 | Proposed |
| 6758 | Rupert | Website Submission of Designs | New Prod. Line | J. Dough | Medium | 01/01/03 | Approved |

(Cancel) (Apply) (Add Project) (New Project) (Spreadsheet Download) (Spreadsheet upload)

| File | Edit | View | Go | Help |

Executive Financial Summary: Proposed Project and Product Portfolio

Financial Summary
The proposed portfolio was evaluated using
    Discount Rate      10%

The portfolio produces
    Net Percent Value      $2,153,432
    Rate of Return      47%
    Cash Requirements      $4,650,650
    Payback Period      11 Months

Manpower Summary
The portfolio represents
    Manpower Requirements      3994 Person days
    Duration      600 days
    People Needed to Avoid Overloading      7 people

Risk And Sensitivities
The Projects return a positive NPV if they finish within an average of
    Percentage of proposed schedule      4%

The proposed products return a positive NPV if they finish within an average of
    Volume Assumptions      10%
    Price Assumptions      10%
    Cost Assumptions      10%

Worst case outcome if all projects overrun to their maximum:-      $4,399,179

Marketing Summary

| Project Types | Num of Projects | Investment | % of total |
|---|---|---|---|
| Minor Release | 2 | 18564 | 18.9% |
| New Platform | 1 | 27453 | 28.0% |
| New Prod Line | 1 | 34542 | 35.2% |
| Standard | 1 | 17643 | 18.0% |

| Product Category | Num of Projects | Investment | % of total |
|---|---|---|---|
| Printers | 1 | 17643 | 18.0% |
| Imaging | 2 | 18564 | 18.9% |
| Publishing | 1 | 27453 | 28.0% |
| Supplies | 1 | 34542 | 35.2% |

Approved Projects

| Project | NPV | Effort Days | Start Date | End Date | Duration | Project Overrun | Volume | Price | Worst Case Outcome |
|---|---|---|---|---|---|---|---|---|---|
| 1002 | -$346K | 444 | 01/01/01 | 5/16/01 | 135 | 450% | 10% | 10% | -$2,447K |
| 1004 | -$353K | 890 | 01/01/01 | 10/28/01 | 300 | 130% | 10% | 10% | -$1,012K |
| 1005 | $1,370K | 1780 | 01/01/01 | 08/24/02 | 600 | 666% | 10% | 10% | $53K |
| 1007 | $1,022K | 296 | 01/01/01 | 09/29/01 | 90 | 7% | 10% | 10% | -$378K |
| 1010 | $462K | 584 | 01/01/01 | 11/02/01 | 110 | -80% | 10% | 10% | $385K |
| Total | $2,155K | | | | 1,235 | | | | -$3,399K |

*FIG. 8*

PROJECT PORTFOLIO: Project resources

PIVOT:

By Phase

By Period

By Resource Type

1010

Project Phases

| Project | Name | Requirements | Design | Development | Test | Release | Total Cost |
|---------|------|--------------|--------|-------------|------|---------|------------|
| 1001 | Project A | 120500 | 0 | 447900 | 0 | 597500 | $1,165,900 |
| 1002 | Project B | 54750 | 159750 | 0 | 97650 | 97650 | $409,800 |
| 1003 | Project C | 0 | 120500 | 447900 | 0 | 597500 | $1,165,900 |
| 1004 | Project D | 0 | 157000 | 0 | 238500 | 0 | $395,500 |
| 1005 | Project E | 0 | 0 | 31400 | 0 | 0 | $31,400 |
| 1006 | Project F | 0 | 0 | 139050 | 41700 | 0 | $180,750 |
| 1007 | Project G | 0 | 0 | 0 | 0 | 0 | $0 |
| 1008 | Project H | 0 | 0 | 0 | 0 | 0 | $0 |
| 1009 | Project I | 273750 | 0 | 0 | 143400 | 125100 | $542,250 |
| 1010 | Project J | 0 | 0 | 0 | 0 | 0 | $0 |
| | | | | | | Total | $3,891,500 |

Submit New Proposal | Project Items | Spreadsheet Download | Spreadsheet upload

*FIG. 10*

METHODS AND SYSTEMS FOR PORTFOLIO PLANNING

BACKGROUND OF THE INVENTION

1. Field of the Invention

The present invention relates generally to methods and systems for creating and managing product and project portfolios. The present invention also relates to methods and systems for creating, evaluating, ranking viewing potential returns of proposed products and projects. The present invention further relates to methods and systems for enabling decision makers to view the contributions proposed products would make over their lifetime and the cash flow that would result from investment and returns. The present invention also relates to methods and systems to enable decision makers to view the consumption of key resources. Also, the present invention relates to methods and systems for developing project or product scenarios based on selected assumptions.

2. Description of the Related Art

Product development today poses unprecedented challenges. To stand out and succeed in competitive and crowded marketplaces, products must be continuously innovative and fresh. As short-lived market opportunities present themselves, product development efforts that once required years now must be executed in a matter of months.

Companies must continuously test new ideas. Scarce investment funds must be allocated to the most promising ideas and opportunities. Projects must be tracked to ensure that the funds committed to those projects are not better employed elsewhere. Product development departments are typically many times overcommitted. Product managers and the executive management team often have no way of determination whether the project under development is well aligned with corporate objectives. Indeed, there currently exists no unified and easy way of determining where the company's finite resources are committed. Moreover, today's executive teams have no way of effectively balancing the risks already extant in the company's investment portfolio with the risks inherent in proposed or existing product development efforts or proposals. Management has no way of seeing an objective view of aggregate resource load, nor do they have the systems to make staffing and resource decisions other than through gut instinct or the opinion of the person requesting such resources. This provides no basis for reallocation decisions or staffing decisions that must therefore flow up the organization as a "take it or leave it" lump. What are needed, therefore, are methods that would provide an analyst or executive the opportunity to balance the profit impact of making changes to the resource pool with postponing or cancelling profitable projects. What are also needed are methods of enabling such analysts to see which resources that may be undercommitted as well as those that may overcommitted, to yield opportunities for profitable rescheduling and to manage the risks in those bottlenecks.

From the foregoing, it may be appreciated that a new strategic planning tool is needed that would assist and provide a unified framework for decision makers in the strategic planning process. Such a tool should lower the cost of the planning cycle, result in a faster time to market and lower the risk of new investment proposals.

To lower the cost of the planning cycle, such a tool should automate the collection of assumptions on which an investment proposal is based, including the collection of financial, resource and marketing information. Other desirable features of such a tool include the ability to rank proposals across many investment criteria and the ability to select those proposals that best for the company's existing portfolio. Also desirable is the ability to create scenarios that include different mixes of investment projects, products and funding and the ability to see the resultant returns of such mixes, preferably summarized across financial criteria and non-financial criteria, such as manpower, risk and marketing criteria, for example. To achieve a faster time to market, product managers and development executives should have at their disposal a tool that enables them to judiciously allocate the limited resources available to them to the most profitable projects, and to enable them to allocate the right resources to the right opportunities. To lower the risks of new projects, the inherent risks of proposed investment and new projects should be calculated as a measure of how accurate the assumptions need to be and till produce a positive return. Preferably, such a tool should present investment proposals in a uniform and balanced manner, both in terms of short term and long-term investments, thereby lowering the risk of being overtaken by competitors.

BRIEF DESCRIPTION OF THE DRAWINGS

FIG. 2 shows a sample investment proposal according to an embodiment of the present invention.

FIG. 4 shows an example of an exemplary user interface for defining the resources to be used by a proposed project or product, according to an embodiment of the present invention.

FIG. 5 shows an exemplary user interface in which the user may enter, review and edit the durations of each phase of a proposed project, according to an embodiment of the present invention.

FIG. 6 shows an exemplary scorecard in which projects or product proposals may be scored and evaluated against the agreed-upon criteria and predefined strategic objectives for the enterprise.

FIG. 7 is a representation of an exemplary user interface for representing all of the projects within a given project portfolio for easy review.

FIG. 8 shows an executive-level summary of a proposed project and product portfolio, based upon selected assumptions. The executive-level summary may include, for example, a financial summary of the proposed portfolio, a manpower summary that summarizes the manpower needs of the proposed portfolio and the risks and sensitivities, in terms of Net Present Value.

FIG. 10 shows an exemplary user interface showing a project portfolio, displayed by project phases and associated costs by phase, according to further embodiments of the present invention.

SUMMARY OF THE INVENTION

Figure 1:
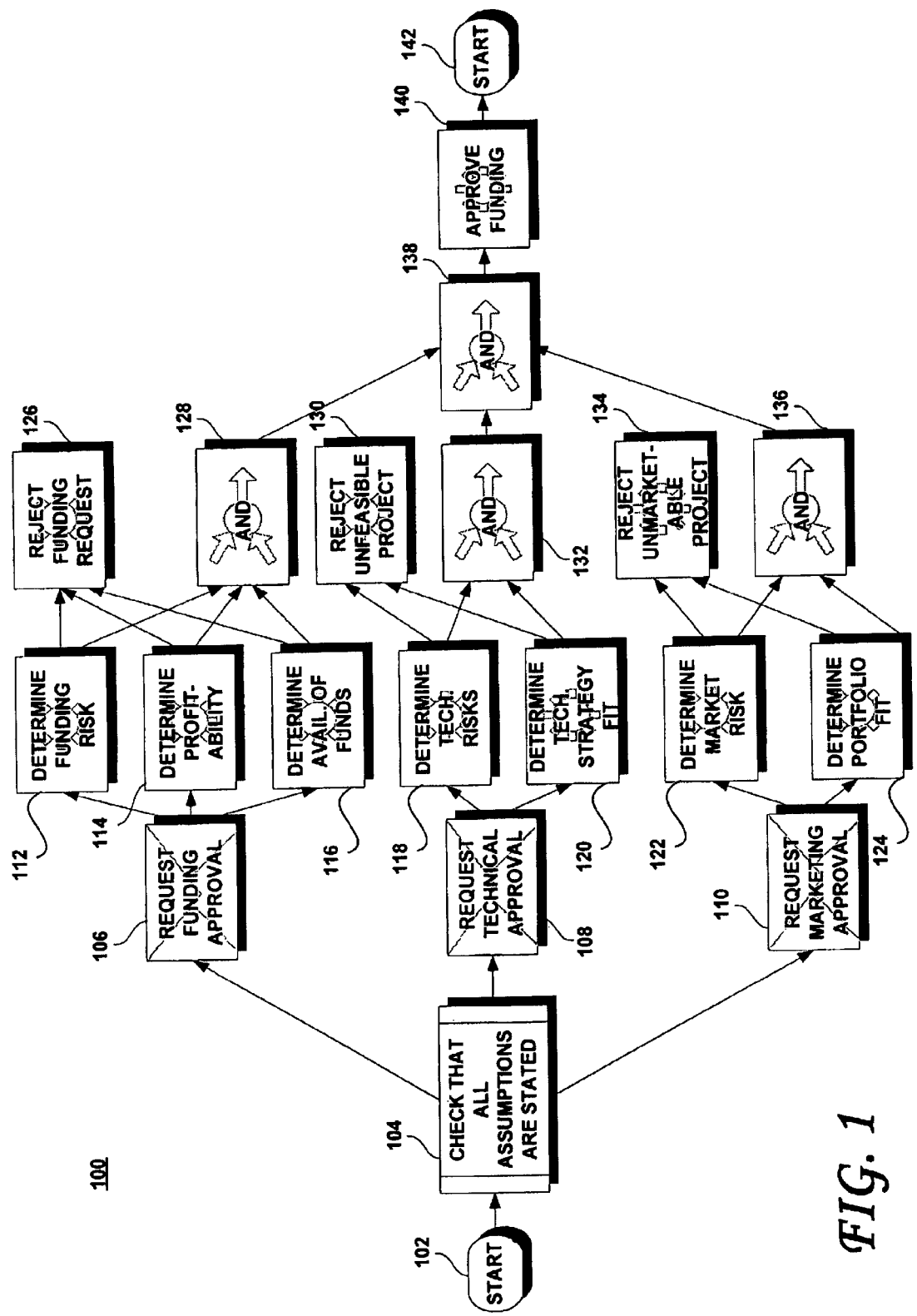
FIG. 1 shows an example of a workflow for defining a product proposal, according to an embodiment of the present invention.

According to an embodiment thereof, the present invention may be viewed as a computer-implemented method of approving or disapproving a request for funding of a proposal within an enterprise, comprising the steps of launching a business process for the request for funding of the proposal, the business process carrying out the steps of: insuring that all assumptions required to complete the request for funding are stated, and insuring that all assumptions required to complete the proposal are stated, the business process, when all assumptions are stated, further carrying out the steps of: forwarding the request for funding to a financial approver for the enterprise and requesting approval of the requested funding from the financial approver; forwarding the proposed project to a technological approver for the enterprise and requesting technological approval of the proposal from the technological approver; forwarding the proposed project to a marketing approver for the enterprise, and requesting marketing approval of the proposal from the marketing approver; disapproving the request for funding if any of the approval requesting steps is unsuccessful, and approving the request for funding if each of the approval requesting steps is successful.

The funding approval requesting step may include steps of requesting a determination of a risk of the requested funding; requesting a determination of a potential profitability of the proposal, and/or requesting a determination of an availability of funds for the proposal, for example. The business process may accept an approval of the requested funding from the financial approver only when the risk and potential profitability are determined to be acceptable and when the funds are determined to be available for the proposal. The technological approval requesting step may include steps of requesting a determination of technological risks of the proposal and/or requesting a determination of a strategic fit of a technology of the proposal to a technological strategy of the enterprise. The business process may accept an approval from the technological approver only when the technological risks are determined to be acceptable and when the proposal is determined to fit within the technological strategy of the enterprise. The marketing approval requesting step may include requesting a determination of a market risk of the proposal and/or requesting a determination of the portfolio fit of the proposal within a predetermined or new portfolio of the enterprise. The business process may accept an approval from the marketing approver only when the market risk is determined to be acceptable and the proposal is determined to fit within the predetermined or new portfolio. The proposal may include a project proposal or a product proposal.

The present invention, according to another embodiment thereof, is a computer system for obtaining an approval or a disapproval of a request for funding of a proposal within an enterprise, comprising: at least one processor; at least one data storage device; a plurality of processes spawned by said at least one processor, the processes including processing logic for: launching a business process for the request for funding of the proposal, the business process carrying out the steps of: insuring that all assumptions required to complete the request for funding are stated, and insuring that all assumptions required to complete the proposal are stated, the business process, when all assumptions are stated, further carrying out the steps of: forwarding the request for funding to a financial approver for the enterprise and requesting approval of the requested funding from the financial approver; forwarding the proposed project to a technological approver for the enterprise and requesting technological approval of the proposal from the technological approver; forwarding the proposed project to a marketing approver for the enterprise, and requesting marketing approval of the proposal from the marketing approver; rejecting the request for funding if any of the approval requesting steps is unsuccessful, and approving the request for funding if each of the approval requesting steps is successful.

The present invention is also, according to another embodiment thereof, a machine-readable medium having data stored thereon representing sequences of instructions which, when executed by computing device, causes said computing device to obtain an approval or a disapproval of a request for funding of a proposal within an enterprise, by performing the steps of: launching a business process for the request for funding of the proposal, the business process carrying out the steps of: insuring that all assumptions required to complete the request for funding are stated, and insuring that all assumptions required to complete the proposal are stated, the business process, when all assumptions are stated, further carrying out the steps of: forwarding the request for funding to a financial approver for the enterprise and requesting approval of the requested funding from the financial approver; forwarding the proposed project to a technological approver for the enterprise and requesting technological approval of the proposal from the technological approver; forwarding the proposed project to a marketing approver for the enterprise, and requesting marketing approval of the proposal from the marketing approver; rejecting the request for funding if any of the approval requesting steps is unsuccessful, and approving the request for funding if each of the approval requesting steps is successful.

The present invention may also be viewed as a computer-implemented method of selecting a plan of record for a proposed product or project within an enterprise, comprising the steps of launching a business process, the business process carrying out the steps of: requesting assumptions of at least one of resources, costs, rates, dates and revenue forecasts for the proposed product or project; generating a baseline plan for the proposed project or product, the baseline plan incorporating the requested assumptions; changing at least one of the incorporated assumptions in the baseline plan and generating a planning scenario based on the changed assumptions; repeating the changing and planning scenario generating steps as needed to create a collection of planning scenarios for the proposed product or project; evaluating the planning scenarios of the created collection against stated criteria of the enterprise, and designating one of the evaluated planning scenarios of the collection as the plan of record.

The business process further may carry out a step of insuring that all requested assumptions are provided before carrying out the baseline plan generating step. The evaluating step further may include a step of requesting that each of the scenarios be scored against the stated criteria of the enterprise. The business process further may also carry out a step of requesting confirmation of the requested assumptions. The business process may further carry out a step of notifying selected parties of the plan of record. The business process may include a workflow, for example. The requesting step may include one or more of the following: a polling step, an email sending step, notification and response steps carried out via a Web-based interface, notification and response steps carried out via a spreadsheet and/or notification and responses carried out via existing applications, for example.

The present invention is also computer system for selecting a plan of record for a proposed product or project within an enterprise, comprising: at least one processor; at least one data storage device; a plurality of processes spawned by said at least one processor, the processes including processing logic for: launching a business process, the business process carrying out the steps of: requesting assumptions of at least one of resources, costs, rates, dates and revenue forecasts for the proposed product or project; generating a baseline plan for the proposed project or product, the baseline plan incorporating the requested assumptions; changing at least one of the incorporated assumptions in the baseline plan and generating a planning scenario based on the changed assumptions; repeating the changing and planning scenario generating steps as needed to create a collection of planning scenarios for the proposed product or project; evaluating the planning scenarios of the created collection against stated criteria of the enterprise, and designating one of the evaluated planning scenarios of the collection as the plan of record.

According to still another embodiment thereof, the present invention may also be viewed as a machine-readable medium having data stored thereon representing sequences of instructions which, when executed by computing device, causes said computing device to selecting a plan of record for a proposed product or project within an enterprise, by performing the steps of: launching a business process, the business process carrying out the steps of: requesting assumptions of at least one of resources, costs, rates, dates and revenue forecasts for the proposed product or project; generating a baseline plan for the proposed project or product, the baseline plan incorporating the requested assumptions; changing at least one of the incorporated assumptions in the baseline plan and generating a planning scenario based on the changed assumptions; repeating the changing and planning scenario generating steps as needed to create a collection of planning scenarios for the proposed product or project; evaluating the planning scenarios of the created collection against stated criteria of the enterprise, and designating one of the evaluated planning scenarios of the collection as the plan of record.

DESCRIPTION OF THE INVENTION

Functional Description

Collecting Business Planning Assumptions that Provide Justification for a Funding Request Embodiments of the present invention automate the collection and use of planning assumptions in a variety of ways, including workflow notifications and responses, polling identified individuals for planning assumptions, lightweight HTML interfaces, standard spreadsheet integration, integration with existing applications and integration with standard external systems, for example. The collected assumptions, however acquired may then be collated into a uniform framework, as described below.

Workflow Notifications and Responses

FIG. 1 shows an example of a seeded workflow 100 for defining a product proposal, according to an embodiment of the present invention. Within the context of the present invention, a workflow may be thought of as the automation of a business process, in whole or part, during which documents, information, notifications and responses or tasks are passed from one participant (such as a person, process or machine) to another participant for notification or action, according to a predetermined set of procedural rules. It is to be understood that the exemplary workflow shown in FIG. 1 is readily extensible and may be modified according to the management processes and procedures particular to the business in which it is employed. The exemplary workflow 100 of FIG. 1 may be initiated by one or more product managers for example and all proposals approved according to such a workflow may form part of the present project portfolio. The workflow 100 begins at 102 and ends at 142. The present workflow enables the preparation of a product proposal and the submission of that proposal to predetermined individuals or parties for approval. As shown, each product proposal may undergo a series of stage gate reviews, in which all the stated assumptions may be validated and reviewed. The proposal may undergo at least three such stage gates (for example) including Preliminary, Functional (Financial, Marketing and Technical Feasibility), and Final Review to approve a product proposal. The Preliminary stage gate 104 determines whether all assumptions related to the product proposal are stated; that is, whether all required fields necessary to define the proposed project have been populated or whether all requested assumptions have been provided. That is, the Preliminary stage 104 ensures that all of the assumptions for the capital request are stated before the proposal is forwarded to management for approval. Thereafter, approvers of the proposal and selected other involved personnel may be notified by the workflow. Such approvers may include, for example, Finance as shown at 106, Engineering as shown at 108 and Marketing as shown at 110. Upon receiving the funding request for the proposed new product, the approver(s) in Finance at 106 may evaluate the funding request according to a variety of criteria and/or strategic objectives established for the enterprise. For example, Finance may determine the funding risk 112, determine the potential profitability of the proposed product, as shown at 114 and/or determine the availability of the requested funds, as shown at 116. Other criteria for approving or not approving the product proposal may be added to or substituted for the criteria shown in FIG. 1, as appropriate for the deploying enterprise. The funding request may be rejected by Finance, as shown at 126. Such rejection may originate from a determination that the funding risk is unacceptably high, from a determination that the proposed product would not be profitable or would be insufficiently profitable to justify going ahead with the proposed product, among other potential reasons for denying funding to a proposed project or product. For example, it may be determined that sufficient funds are not available to properly fund the development of the proposed product. Engineering may determine the technological risks or feasibility of the proposed product at 118 and determine whether the proposed product fits within the technological strategy of the company as shown at 120, among other possible determinations. Following a review of the required technology of the proposed product, Engineering may reject the proposed product as unfeasible as shown at 130 or as not fitting within the company's technological strategy, for example. As shown at 122 and 124, Marketing may also evaluate the market risk of the proposed product and whether the proposed product fits within the company's existing or desired portfolio of products and/or services. If Marketing evaluates the potential market risk or determines that the proposed product does not fit the company's existing or desired portfolio, Marketing may reject the funding request, as shown at 134. If Finance, Engineering and/or Marketing reject the funding request for the exemplary reasons outlined above or for any other reason, the request for funding may be denied. This is indicated in FIG. 1 by the Boolean AND operators at 128, 132, 136 and 138. Indeed, only if Finance, Engineering and Marketing each indicate their approval may the request for funding be approved, as shown at 140, whereupon the workflow ends at 142. The workflow may carry out additional steps, such as notifying the concerned parties as to the approved/disapproved status of the request, for example.

Project Scenario Planning Workflow

Figure 3:
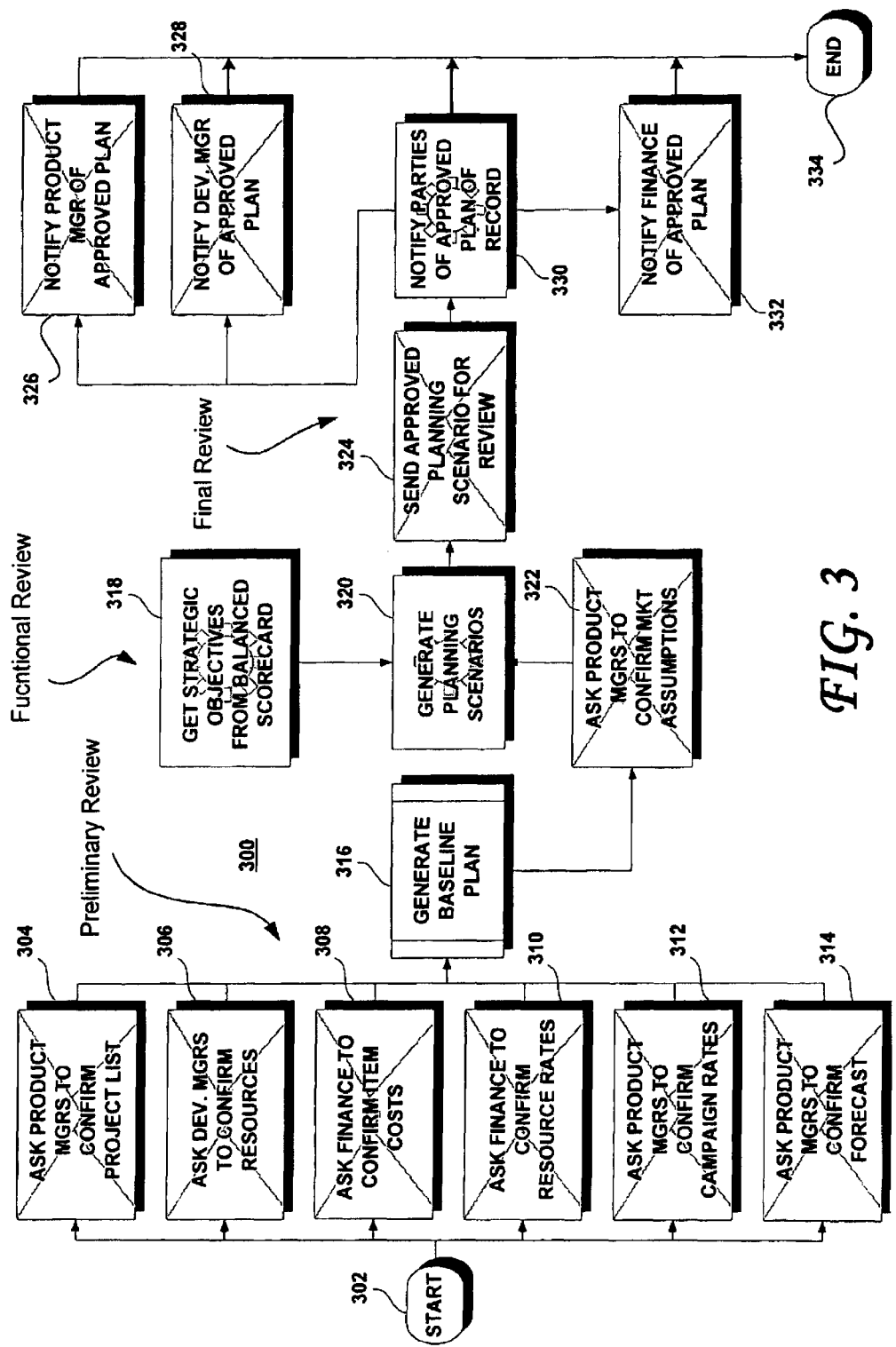
FIG. 3 is a representation of an exemplary workflow for generating planning scenarios and selecting one of the defined scenarios as the plan of record, according to an embodiment of the present invention.

FIG. 3 is a representation of an exemplary workflow 300 for defining, generating and approving scenarios from a collection of scenarios, according to an embodiment of the present invention. A scenario allows project managers to make a number of assumptions and determine the manner in which changing those assumptions affect various aspects of a proposed project or product. According to an embodiment, project managers may initiate this process and generate multiple scenarios. However, only one scenario may be approved from these scenarios, which approved scenario forms the "Plan of Record".

The exemplary workflow of FIG. 3 begins at 302, whereupon the appropriate product manager, development managers and the appropriate finance personnel may be contacted via a workflow, email, Web-based interface or by polling (for example) to provide and/or confirm projects lists at 304, required resources (both human and equipment) for the proposed product at 306, projected item costs at 308, the projected rates of such resources (in $/hr. or any other appropriate measurement thereof) at 310, campaign rates at 312, and forecasts at 314. Other assumptions may be requested and/or require confirmation, as needed. Such requests for planning assumptions may be delivered via workflow notifications (which may include email and/or Web-based notifications, for example). For example, the notified persons may be invited to click or otherwise select a link on an email or browser screen and/or permitted to or invited to log onto the application embodying an embodiment of the present invention and, in an appropriate user interface, prompted to supply the requested assumptions and/or to validate pre-seeded assumptions (obtained from a template, for example). The workflow or other mechanism may verify that the contacted parties people have responded to each of the requests for planning assumptions or confirmations. Such a workflow or other mechanism may persistently request the necessary assumptions or confirmations until the required information has been provided. Through workflows, the following exemplary roles may be polled for the stated assumptions in the portfolio planning process:

Product Managers may be polled for project lists;

Product Managers may be polled to confirm campaign plans;

Product Managers may be polled to confirm volume forecasts;

Development Managers may be polled to confirm resources;

Finance may be polled to confirm Item Costs, and

Finance may be polled to confirm resource rates, for example.

Preferably, the workflow(s) used for gathering the assumptions from finance and the appropriate product and development managers are extensible and may be modified according to the established enterprise product line management processes and procedures.

Upon successfully gathering the required confirmation assumptions, a baseline plan may be generated at 316, from which a number of planning scenarios may be generated. The baseline plan may be generated from the gathered assumptions and may form the basis of one or more scenarios in which these assumptions are selectively changed. Thereafter, the appropriate product managers may be polled to confirm, at 322, the market assumptions used in generating the scenarios. The enterprise's strategic objectives may also be obtained from a balanced scorecard, as shown at 318 and as discussed in detail below and the scenarios evaluated against such strategic objectives or criteria. From this process, an approved planning scenario may be chosen from among the planning scenarios generated in step 320. After the approved planning scenario has been successfully reviewed, the approved planning scenario becomes the approved plan (the Plan of Record), and the involved parties may be notified thereof, as shown at 330. For example, the product manager(s) may be notified of the approved plan at 326, as may be the development manager at 328 and Finance, as shown at 332. This exemplary workflow ends at 334.

As shown in FIG. 3, each project scenario may be shepherded through a series of stage gate reviews, where all the stated assumptions are preferably validated and reviewed. For example, each project scenario may be shepherded through a preliminary review (e.g., 304-314), a functional review that may include, for example, review of the financial, marketing, resource feasibility, and strategic assumptions, and a final review to approve a product proposal from the generated planning scenarios. The functional review may focus on, for example, the review and validation of the direct and indirect costs, pricing, market size, contribution, market size, resource availability and the degree to which the proposed project or product is aligned with the enterprise's stated strategic objectives or other criteria.

Setting Up a Portfolio Planning Cycle

Naming and Assigning Characteristics to Project Proposals

At the outset, a project proposal may be created and assigned a name, project type and start date.

Initiating a Planning Cycle

To initiate the process of gathering the required assumptions, an embodiment of the present invention includes a process of initiating a portfolio planning cycle. In such a portfolio planning cycle, selected product managers and cost accountants may be polled to obtain their planning assumptions. To do so, a workflow (or other automated or semi-automated business process) may be chosen and initiated to prompt the appropriate parties to provide the requested information. For example, one of the workflows available for such purposes may be a workflow designed for capital budgeting purposes, while another may be designed to gather the required assumptions for a product portfolio review. Advantageously, functional diagrams of the workflows may be reviewed before a particular workflow is selected. The workflow initiator (and/or those with appropriate permission levels) may review the progress of a planning cycle that is in progress, to abort a planning cycle that is in progress, to review previous planning cycles. For example, an embodiment of the present invention enables the review of the planning assumptions submitted by each person for volume assumptions, costing assumptions and project timeline assumptions, for example.

Embodiments of the present invention may be implemented using lightweight HTML user interfaces to gather the required assumptions and to display pertinent information. Representative examples of such user interfaces for defining and initiating a planning cycle are discussed below.

Defining the Planning Calendar

For example, a lightweight Hyper Text Markup Language (HTML)—or dHTML, XML, etc.—user interface (UI) may be devised to define the planning calendar. Such a UI should enable the user to define the periods for which information may be collected over a predetermined planning horizon. For example, the defined planning horizon may be 5 years and the user may wish to review information in monthly time buckets or increments. The planning calendar may optionally be populated from an existing and predetermined General Ledger (G/L) calendar, for example. Embodiments of the present invention may enable the designation of which days of the week are to be defined as working days, within the context of the planning cycle. For example, workdays may be designated as Mondays through Fridays, for example.

Defining Resource Types

In addition to defining the planning calendar, embodiments of the present invention enable the types of resources to be utilized in a proposed project to be defined, again through a lightweight HTML UI, for example. Through such a UI, the user may define the number of resources that are available of a given resource type for portfolio planning. Examples of (human-type) resources may include Product Managers, Development Engineers, Quality Engineers and Release Engineers, for example. FIG. 4 shows an example of a Web-based UI for defining the resources to be used by the proposed project or product. Resources may be identified by type, may be assigned to a selected department, may have a level of availability, may have a rate at which they charge for services, which rate may change over time. The resources may have other characteristics, which may also be defined herein. In the example shown in FIG. 4, 10 quality assurance engineers are assigned to the proposed project. New resource types may readily be added, as required.

Defining Project Types

Embodiments of the present invention enable the definition of the types of projects to which development resources may be applied. Examples of such project types may include, for example, product line extensions, new product lines, technology uptakes, product maintenance and product enhancements, to name a few possibilities. The definition of project types may later be re-used as a project type template that future projects of that type may use. The project types may be added, edited, selected and reviewed in a lightweight HTML (for example) UI, similar to that shown in FIG. 4.

Defining the Project Phases for a Project Type

Complex projects require that they be broken down into manageable and well-delineated phases. A project phase, for macro level planning purposes, may be defined by duration and a sequence. Accordingly, the phases of the project may be ordered and each phase may be assigned a duration. The duration of each phase is preferably assigned. Moreover, the best case, the worst case and the most likely durations may advantageously be identified for each phase of a project. Similarly, the most likely, least and most number of person-days (and/or other metric appropriate for the resource) required for each resource type within each phase are preferably defined. FIG. 5 shows an example of a lightweight UI in which the user may define, input, review and edit the durations of each phase of a proposed project. In this example, the project type is Enhancement, such as would be undertaken to enhance an existing product line, for example. In this illustrative and exemplary case, the Requirements phase for this project type is an illustrative 60 days, the Design phase is slated to last 34 days, the development phase 32 days and the Release phase is assigned a duration of 26 days.

Defining the Resources Required in a Phase

Each project phase of a project of a given type requires the expenditure of resources of some kind. Embodiments of the present invention enable the user to define the resources (human, machine and material, for example) that are required for each phase of a proposed project. Requirements may include such human resources as personal from various departments, such as personnel from Product Management, Development Engineering, Quality Engineering and Release Engineering, for example. Therefore, an example of defining the resources required during a phase of a proposed project may be that a requirements definition phase of the proposed project may require 20 workdays of Product Management and 30 workdays of Development Engineering, 8-work day of Quality Engineering and 2 workdays of Release Engineering.

Phase Duration and Resource Load for New Projects

Proposed project definitions may be used as templates for later-defined projects of the same type, and the values therein may be used as pre-seeded values for projects or products of the same type. Using such project templates, the phases, the phase durations and resource requirements for project or product proposals may be derived from a selected project or product template of the same project or product type. Project phases may be calculated forward from project start date defined for the new project, based upon the corresponding phase duration in the project template. Other assumptions may be similarly calculated, both from inputted values and from stored values in the selected project template. This enables the definition of past or in-progress projects to be re-used for future proposed projects.

Phase Duration and Resource Load for Projects in Progress

Similarly, phase durations and resource requirements for project proposals may be estimated based upon a project template for the same project type. The project phases start dates and durations may be loaded from higher-level applications or manually entered, for example. Similarly, Resource Requirements for the proposal may be loaded and/or estimated from the selected project template of the same project type.

Defining the Scope of a Proposal

The scope of a project may be defined. A project may require greater or lesser resources depending on the scope of the project and/or last a shorter or longer period of time. For example, three scope codes may be defined, such as High, Medium and Low. If the Medium scope code is defined as unity in terms of scope, the High and Low scope codes may be defined in relation to the Medium scope code. For example, projects being defined as Large in scope may be defined to have 50% greater resource requirements and a 40% greater duration than projects of the Medium scope. These relative percentages may be adjusted and additional scope codes may be defined, as needed. Similarly, a project of Low scope may be defined to require 20% fewer resources and have a duration that is 10% shorter (for example) than a project having been assigned a Medium scope code. Other scope metrics may be defined at will.

Non-Project Capital Expenditure Request

Embodiments of the present invention enable the user to define capital expenditures that may not be directly related to the proposed product. Such expenditures may, for example, represent tooling requirements or changes to the factory layout to accommodate the new product. A suitable UI may enable the user to enter such information, which may then form part of the proposal. Such non-project capital expenditure requests thereafter form an integral part of the project proposal, thereby giving decision makers a more complete picture of the total expenditures required by the proposed project.

Competitor Information

In defining a new project proposal, it is useful to define the competitive landscape in which the proposed product will be launched. Embodiments of the present invention enable the user to define the major competitors of the proposed product, along with, for example, size and unit pricing information. One or more scores may be assigned to each competitor product relative to the key features of the proposed product. This enables development managers and the like to rate the proposed project or product against the offerings of competitors, if any.

Market Assumptions and Decay Profiles

Figure 9:
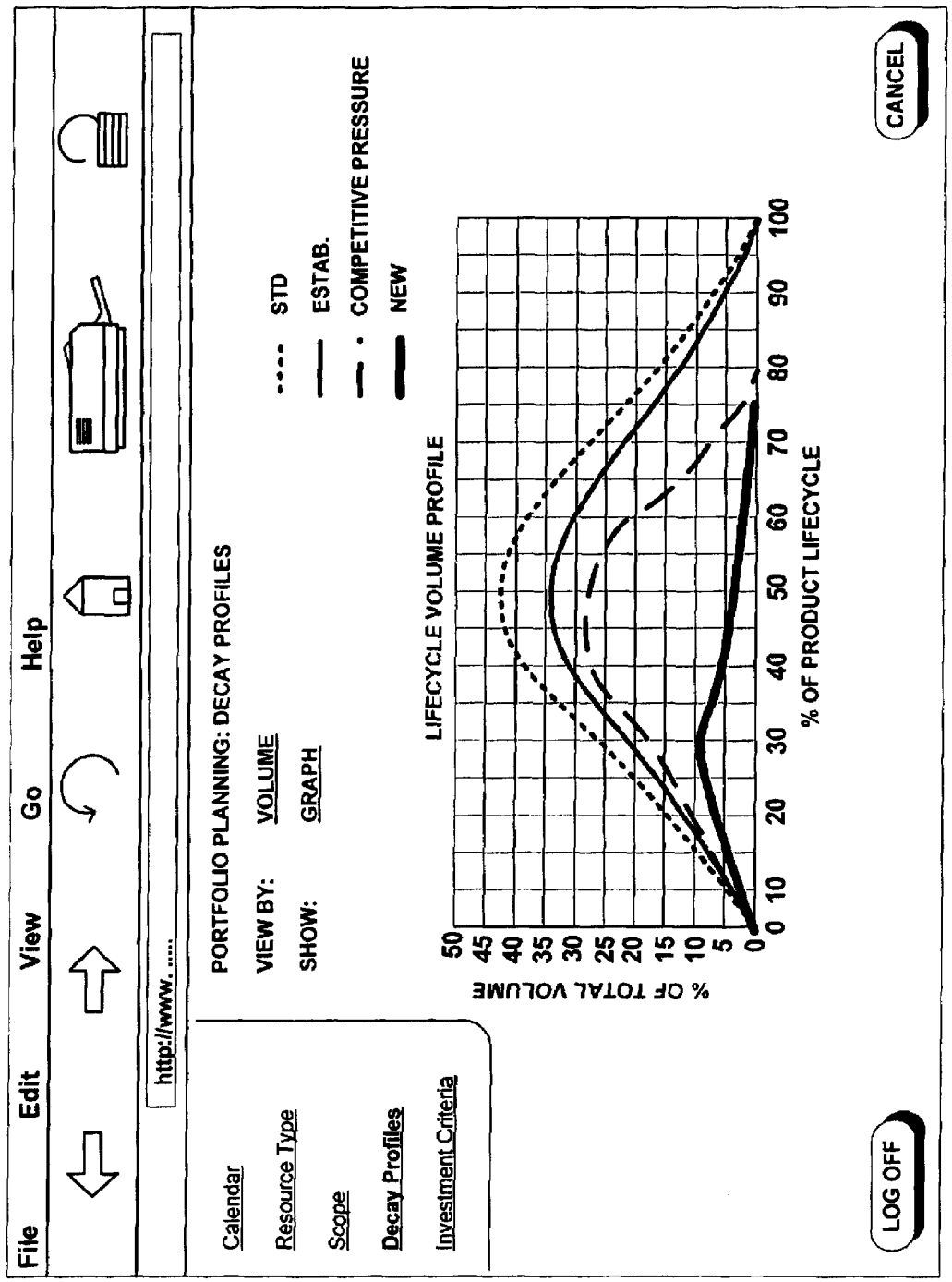
FIG. 9 shows an exemplary user interface showing a graphical representation of a product decay profile by volume, according to further embodiments of the present invention.

Embodiments of the present invention enable the user to set decay profiles for products that enter the market during the market window. The decay profile may be displayed to the user in a tabular format or graphically, as shown in FIG. 9 The decay profiles generated for the proposed product may affect the price and volume estimates obtained from (for example) marketing. For example, the original price and volume estimate from marketing may be penalized by a given percentage for each percentage of the anticipated life of the proposed product. Moreover, the degree of decay may be greater after the market window has closed and as normal channels of distribution close.

Portfolio Product Aging Analysis

Figure 13:
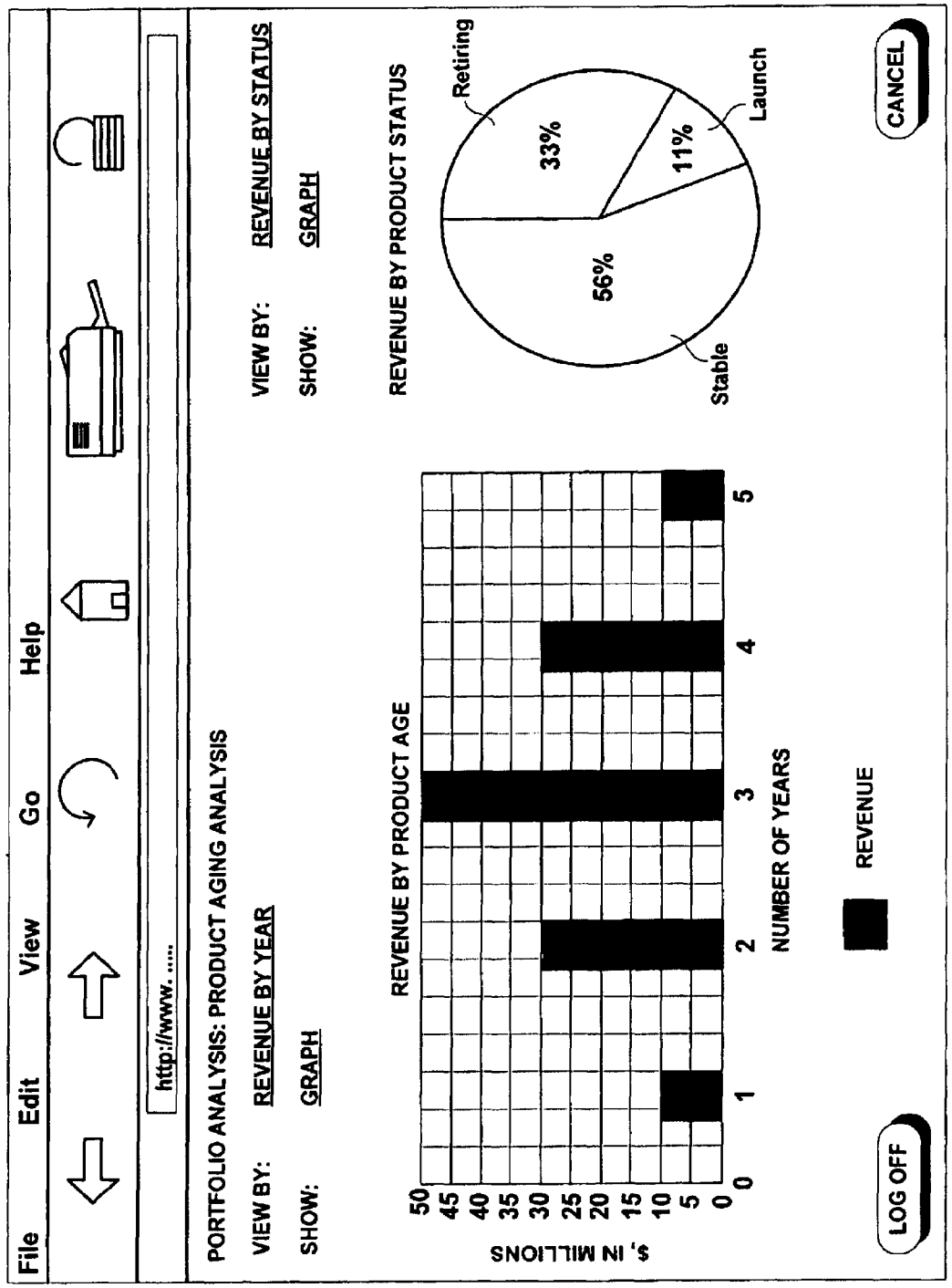
FIG. 13 shows an exemplary user interface that includes graphical and tabular representations of a portfolio product aging analysis, according to still further embodiments of the present invention.

After the proposed product is approved and entered into production, embodiments of the present invention enable the user to track revenue generated by the product. This aids product managers with End of Life and portfolio aging analysis. Portfolio analysis enables the product managers to see, at a glance, the age of the revenue generated by the product. The age of the revenue may be measured from the event when the sold items change to production status. An example of a revenue aging analysis is shown in FIG. 13. Aging revenue may also be viewed by status, such as Launch, Stable and Retiring. FIG. 13 also shows a pie chart enabling product managers to determine the percentage of revenue by status. Other graphical (or text-based) representations may be generated to show such aging data. For example, the data graphically represented in FIG. 13 may also be represented in tabular format, at the user's choice.

Defining Product/Project Balanced Scorecard

As shown in FIG. 6 and according to embodiments of the present invention, any investment, project or product proposal may be scored and evaluated against the agreed-upon strategic criteria for the enterprise. These criteria may be classified at will. Exemplary classifications may include Minimize Market Risk, Maximize Market Fit, Minimize Technology Risk, Maximize Fit with Core Technologies and Maximize Strategic Fit, to identify a few possibilities. For each project, a weighting may be assigned to each of the criteria, to quantify the manner in which the proposed project fits the identified objectives of the enterprise. For example, within the context of the enterprise, a reduction in market risk may be more highly valued than increasing the market fit. Therefore, such a valuation would warrant that the reduction in market risk criteria be assigned a lower weight than the weight assigned to the criteria of increasing market fit.

Weighting Strategic Objectives

Each of the investment criteria may have one or several strategic objectives associated therewith. Each strategic objective may be associated with a weight that may be chosen to reflect its relative importance. Using criteria and strategic objectives, any investment proposal may be scored against the agreed upon criteria and strategic objectives of enterprise. For example, in the case of a printer manufacturer, the defined strategic objectives within the Strategic Fit criteria may include "Win at the low end of the market", "Move the world to digital printing", "Exploit shared printing leadership" and "Develop low touch sales model". Each strategic objective may be assigned a weight, as described above. For example, winning at the low end of the market may be more highly valued than other strategic objectives and the company may be willing to invest a greater proportion of its portfolio in projects that contribute toward that goal. Such a strategic objective should, therefore, be assigned a higher weight than the other objectives. The scoring of the strategic objectives may be carried out, for example, via a lightweight HTML UI, as described above. New strategic objectives may be added to any of the criteria, as needed.

Defining Best Case/Worst Case Outcomes

Embodiments of the present invention may also enable the user to declare a best case outcome, a worst case outcome as well as the most likely outcome for the duration of a project, the resource loading within a project and the projected costs of a proposed project.

Defining Probability Distributions

To aid decision makers in evaluating the trustworthiness of data and projections presented to them, probabilities may be defined for a given phase of a proposed project being completed in a given timeframe; resource being available at a given cost and resource being available in a given quantity, for example. Other probabilities may be defined, as those of skill in this art may recognize.

Spreadsheet Based Integration

Embodiments of the present invention enable users to enter requested planning assumptions in a standard spreadsheet and to integrate those planning assumptions into an application embodying an embodiment of the present invention. For example, spreadsheets may be integrated through the use of Oracle Applications Desktop Integrator, developed by the present assignee Oracle Corporation, although other means of importing spreadsheet data may be utilized. According to other embodiments of the present invention, the reverse process may also be carried out. That is, planning assumptions, product proposals and other project scenarios obtained as described and shown herein may be downloaded into one or more spreadsheets for off-line analysis, and presentation, for example.

Investment Proposal

Before a request for funding may be submitted for approval according to a workflow such as described relative to FIG. 1, it should be fully defined. Embodiments of the present invention provide a standardized tool for the collection and presentation of all assumptions necessary to fully define an investment proposal. Such a standardized tool may be advantageously used by product development executives, management accountants, and product managers (for example) engaged in creating investment proposals, uploading, downloading, editing, reviewing, or submitting them for approvals. Decision makers may then view, change or edit such an investment proposal and decide whether to deny or approve the investment proposal. Embodiments of the present invention provide a number of advantages, including:

1) lower risks by ensuring all assumptions are stated and challenged before funding is approved.

2) higher profits ensuring project proposals meet returns thresholds and lowering the costs of the planning cycle.

3) faster time to market by focusing resources on projects that are in concert with corporate objectives.

As shown in the sample investment proposal of FIG. 2, an investment proposal may be organized in two major subgroups, namely product proposal assumptions 202 and project proposal assumptions 204. The sample investment proposal of FIG. 2 is drawn to a proposed project to develop a new inkjet printer, the fictitious CP4320 inkjet printer. According to embodiments of the present invention, investment proposal information is broadly grouped in two major subject areas:

Product/Brand Proposal Management Assumptions, which may include product strategy, marketing assumptions, key product features & competitors, product contribution, financial ROI (Return on Investment), sales management and product collateral, for example.

Project Proposal Management Assumptions, which may include project definitions, logistics, resource requirements, risk assessment and project approvals, for example.

Product proposal assumptions may, for example, cover strategic objectives 206 for the product in question in concert with corporate objectives for the plan period; product marketing assumptions 208 regarding size, growth, market window of opportunity, market concentration, pricing and revenue potential, key features 210 of the proposed product and how such key features differentiate the proposed product from products of competitors and revenue cost of goods sold (COGS) and contribution scenarios as shown at 212, for example. Project proposal assumptions 204, on the other hand, may include development project information, a financial analysis 214 of the project, the resource requirements 216 for the project, a risk and sensitivity analysis 218, an identification of likely prospective customers 220 for the product, contacts 222 for the investment proposal, collateral 224 and approvals 226, for example. Each of these is discussed in detail below.

Product/Brand Proposal Management Assumptions

Product Strategic Objectives 206

Embodiments of the present invention may utilize a Balanced Scorecard™ tool to define and communicate the enterprise's strategic objectives. The Balanced Scorecard™ (aspects of which are shown in FIG. 6) integrates the product strategic objectives into the strategic planning process to ensure that the criteria used to evaluate projects and products are consistent with these objectives. The product strategic objectives may be selected from groupings of such product objectives. Each such grouping may be identified by a scorecard name. In the exemplary and illustrative case shown in FIG. 2, the scorecard name is GROWTH. Each of the product strategic objectives may be edited at will and new objectives may be defined within a scorecard. The proposed product may be evaluated against the strategic product objectives of the selected scorecard and a score assigned, the assigned score being dependent upon how well the proposed product meets the identified product objectives. Approval or disapproval decisions may then be made at least partly dependent upon the assigned score(s).

Market Assumptions 208

The Market Assumptions section in Investment proposal of FIG. 2 sets forth the assumptions that were previously collected (through workflow and/or polling in the manner described above, for example) regarding the market for the proposed product, as well as an indication of whether various due diligence studies have been performed. These market assumptions may include one or more of the following exemplary market information, which may be edited, as required.

Market Size: Overall annual market size for similar products expressed in several alternate units of measure such as: Each, Per Month, Per User, and Percentage of Development Expense etc. These units of measure are extensible.

Growth rate: Annual percent growth rate in sales volume.

Window of Opportunity: the product launch date defines the window open date and the product end of life indicates the window close date.

Test Market: indicates if Test Market has been performed.

Sales force Feedback: indicates if sales force feedback has been performed.

Focus Group: indicates if a focus group has been performed.

Market Concentration: may be defined by the number of companies that collectively hold a user-definable percentage (for example, 80%) of the Market Share by estimated sales volume.

Expected Unit Price, Sales Volume, and Sales Revenue: indicates the expected unit price at product launch, annual sales volume and expected sales revenue for the proposed product.

Competitors and Key Product Features 210

The competitors and key product features section 210 holds a matrix of relative comparisons of product features and the main competitors. Continuing with the illustrative example of the printer manufacturer developed above, examples of key product features may include:

Photo Quality Printing;

Simultaneous Scanning and Printing;

Image to Text Conversion;

Duplex Capability, and 45 pages per minute printing.

It is understood that these features/feature groups may be different for different products and industries. Moreover, the competitors and key product features section 210 may show qualitative comparisons for the proposed product features across five top competitors based on last year sales volume, for example. The feature groups, and features by product groups and the qualitative comparisons during the brand review may be edited, as required.

Revenue, Cost of Goods Sold, and Contribution 212

Financial product analysts may be able to create and edit the contribution statement for a product spanning a predetermined time period (such as, for example, three years) under three (for example) predefined scenarios such as: Best, Likely and Worst. Exemplary fields may include:

Estimated sales volume,
Estimated unit price, and
Estimated Unit Cost.

These variations may be entered and/or changed for several scenarios, and across the predetermined time period, as needed. From these entries, the following may be estimated:
Sales Revenue,
Cost of Good Sold (COGS),
Contribution, and
Contribution (%)

Contribution analysis in this section may be specific to the proposed product across the predetermined time period.

Other product proposal assumptions may be included in the Investment Proposal representation of FIG. 2, the present invention not being limited to the exemplary specifics shown therein.

Project Proposal Management Assumptions

Development Project Information 204

Development project managers may be able to associate this investment proposal with one of their projects. One or more of the following exemplary project attributes may be reviewed and/or changed:
Project Number;
Start Date: When the development project is initiated;
Workdays: Level of effort in person workdays;
Allocation (%): Percentage of common costs of a group project attributable to this product/project;
Best Cost: Estimated best-case cost scenario;
Likely Cost: Estimated most likely cost scenario;
Worst Cost: Estimated worst-case cost scenario;

Other attributes may be available for review and/or change, the above list being only illustrative in nature. The development project may also show:
Project objectives: drives the product priorities.
Corresponding Scorecard Name: Identification of the grouping of project objectives.
Project Score: score obtained from Balanced Scorecard tool or other scoring or weighting methodology.

Financial Analysis 214

Since the present investment proposal tool has been supplied with assumptions relative to revenue, direct costs and development cost information, the financial analysis section 214 may compute a number of performance metrics based on these assumptions. Exemplary performance metrics may include:
Net Present Value
Investment Performance
Internal Rate of Return, and
Payback Period While these metrics may readily be calculated, they may be modified by suitably modifying the core financial drivers of such calculations. Custom financial metrics may also be defined, as may be the methods of calculating such metrics.

Resource Requirements 216

Development project managers and/or selected others may associate this proposal with the resource requirements aligned with the level of effort outlined in the development project information 204. Resource requirements may be reviewed and specified by the following attributes, for example:
Resource type;
Person days/Amount, and
Headcount/Quantity;

The resources that may be specified and/or reviewed are not limited to human resources only, but may include other resources, such as material, machine tools, and the like.

Risks and Sensitivity Analysis 218

The Risk and Sensitivity Analysis section 218 may generate multiple versions of project proposals, each based upon different assumptions. This allows the enterprise's risk management group to model a variety of "what if" scenarios based on project-overrun situations, and to ascertain the corresponding upside/downside impact on product volume, cost, and pricing.

To develop such "what if" scenarios based upon project overruns, embodiments of the present invention, the following attributes may be reviewed and/or specified:
Project Overrun (%): Percentage Overrun on the project based on Level of Effort;
Project Overrun (Days): Number of days, project overruns from target completion date;
Volume Impact: Percentage increase/decrease in Product Volume;
Price Impact: Percentage increase/decrease in Product Price, and
Cost Impact: Percentage increase/decrease in Product Cost Each of these versions of the project may be assigned a unique proposal number and may be accompanied by an appropriate scenario description. Only one of these scenarios may be actively linked with a development project at any time (as the plan of record).

Prospects 220

The Prospects section 220 provides an opportunity to link the proposed product with one or more prospective customers to create prospects/leads for the eventual sale of the proposed product.

For example, the prospects information may include
Customer ID;
Customer Name, and
Customer Street Address.

This prospect information may be seamlessly transferred to other applications for leads and opportunities management.

Contacts 222

The Contacts section in the Investment Proposal shown in FIG. 2 may link the investment proposal to one or more enterprise employees, to create a contact list relevant to the investment proposal. For example, the contact section 222 may include contact information such as:
Role Type: List of Values (Pre seeded, e.g. Product Manager, Sponsor)
Employee Name, and
Telephone, email etc.

This contact information may be available for reference during the proposal development, launch and proposal life cycle.

Collateral 224

The Collateral section 224 of the Investment Proposal of FIG. 2 may provide a direct link to an enterprise's document repository system and may provide links to one or more documents relevant to the proposed product or project. The Collateral section 222 may include a description and/or links to related documents and information relating to such documents including, for example:
Document Type: List of Values (Pre seeded, e.g. Brochure, Installation, Support etc.)
Document Name, and
Part Number, etc.

This collateral information may be available for reference during the product development, launch and product life cycle.

Approvals 226

This section is targeted to product development executives, management accountants, and product managers (for example) engaged in:

Creating Investment proposals: online or a template based spreadsheet;

Uploading proposal from the Excel spreadsheet;

Downloading proposal into the Excel spreadsheet for offline or online review and analysis;

Online editing and reviewing of proposal;

Submitting proposal(s) for approvals: supports workflow based business practices depending on type of product, size, complexity etc. A default approver may be identified, which default approver may be overridden with another employee, as needed.

The Approvals section 226 may display, for example, the date of submission of the Investment Proposal, the date of approval (if any), and the product proposal status for reference. This section may have pre-seeded business processes workflows, and may be fully extensible to model special business procedures, as required.

Embodiments of the present invention, therefore, provide tools that enable product development executives, management accountants, and product managers engaged to review, prioritize, and approve product development activities. All of the projects within a given project portfolio may be grouped for easy review, as shown in FIG. 7. Embodiments of the present invention enable the user to select a planning cycle, such as "Mid Year Forecast FY03", as shown at 702. A scroll down menu of planning cycle choices may be presented. Also, the user may select a particular portfolio of projects to be displayed, among all existing portfolios, as suggested by reference numeral 704. In FIG. 7, the exemplary selected portfolio includes all projects relate to printer development, solely to illustrate further aspects of the present invention. Responsive to the selection of the desired planning cycle and the desired portfolio, a table 706 may be displayed that lists all of the constituent projects of the selected project portfolio. The table 706 may include, for example, one or more columns for the project number (or other unique project identifier), for the project name, a description of the project, the type of project, the project manager, the scope of the project (e.g., small, medium or large, etc.), the project start date and the approval status of the project (e.g., approved, denied, recommended, etc.). Other columns may be added or substituted for the exemplary columns shown. Such a table 706 enables the decision makers and the project managers, for example, to quickly view (and edit) all projects that meet the selected planning cycle and the selected portfolio. The information in the table 706 may be uploaded to or downloaded from a spreadsheet, as needed. New projects may be added to the portfolio, also as needed.

Scenario Development

To aid in such reviews, prioritization, and approval, embodiments of the present invention enables the creation and evaluation of different funding, timing and project scenarios. These scenarios may be saved, communicated and evaluated without affecting any of the enterprise's operational planning systems. Each scenario within a planning cycle may be assigned a unique name. For example, a scenario may be descriptively named, such as "Preliminary Proposal for the Q2 Capital Budget Planning Cycle", for example. More than one scenario may be created within a given planning cycle without overwriting previously created scenarios within a given planning cycle.

Drill and Pivot Capability for Projects in a Project Portfolio

Portfolio information may be presented at any level of summarization. FIG. 10 shows a project portfolio, displayed by project phases and associated costs by phase. The projects in a portfolio, however, may be also viewed by period or by Resource Type (for example) by clicking on the choices available at 1010.

For example, a technology company may review its investment portfolio by project at the:

Category Level to see the balance of investments between Marketing, Research, and Development Projects;

Project Type level to see the balance of investments between product line extensions and new product lines.

Project level to see the spread of investments and resource requirements during the various development phases of the project.

Drill and Pivot Capability for Projects in a Product Portfolio

Figure 11:
FIG. 11 shows an exemplary user interface illustrating the drill and pivot functionality for projects in a product portfolio, according to another embodiment of the present invention.

As shown in FIG. 11, embodiments of the present invention enable similar functionalities for products as are present for projects. Indeed, a product portfolio may be viewed by item number, each item potentially belonging to a project, also identified. Each item in the portfolio may have an associated description and cost allocation. For example, a printer manufacturer may choose to review his investment portfolio by product at the:

Market Level to see the balance of investments between Business and Consumer markets;

Platform Level to determine to see the balance of investments between Laser jet and Inkjet platforms, or at the Brand Level to see the balance of investments between 16 ppm and 32 ppm brands.

Alternately, the printer manufacturer may choose to review his investment portfolio by product at the:

Product Category Level to determine the balance of investments between Laser jet and Inkjet platforms;

Product Level to see the balance of investments between several 32 ppm and 16 ppm products, or at the Brand Level and assess impact of the associated development project overruns on product volume, cost, revenue and contribution.

Cash Flow Analysis

Figure 12:
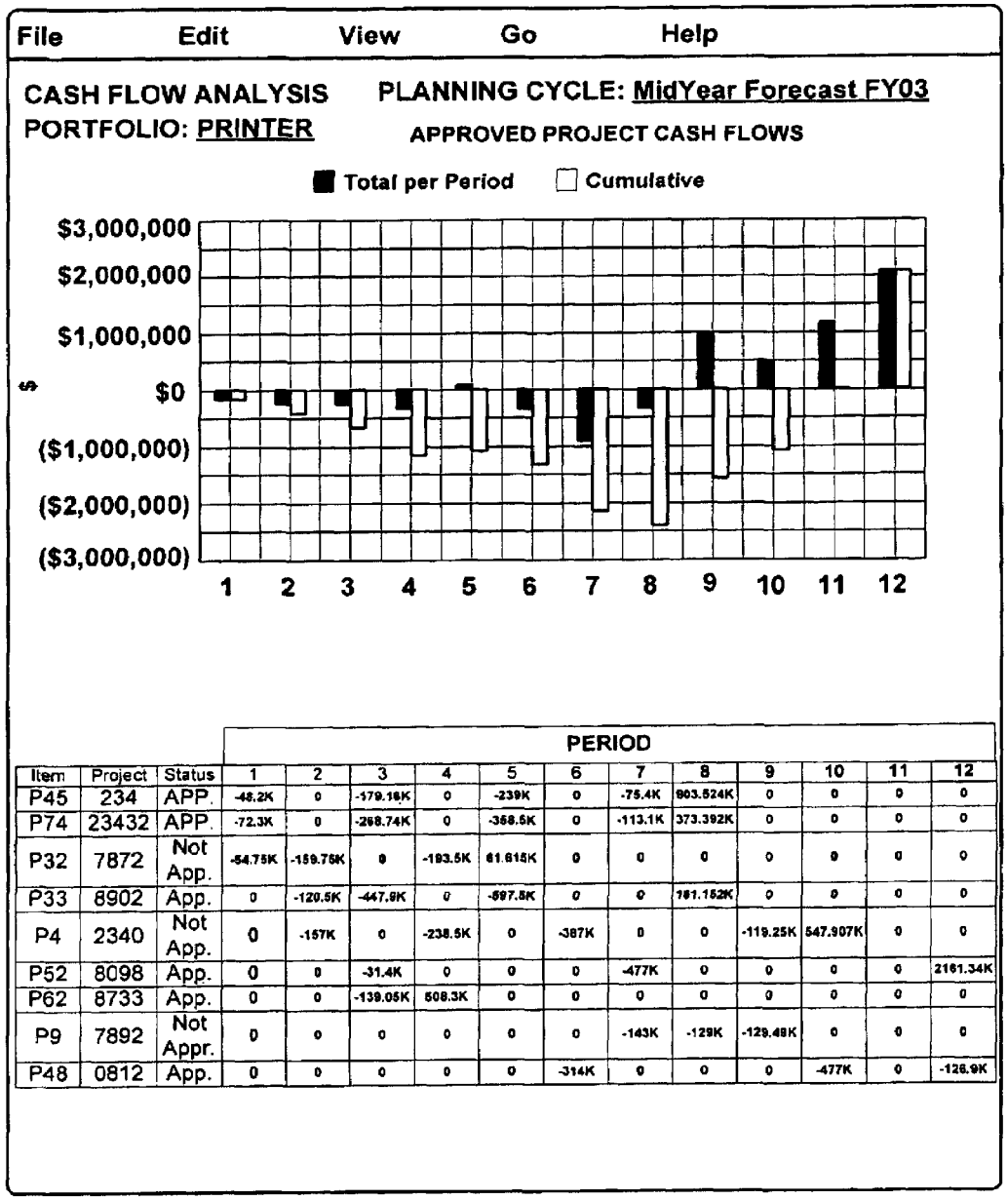
FIG. 12 shows an exemplary user interface that includes graphical and tabular representations of cash flows, according to further embodiments of the present invention.

FIG. 12 shows a representation of a cash flow analysis according to an embodiment of the present invention. Such cash flow analysis may combine the cash flow for all approved projects within a selected portfolio, derived from, for example, development costs, revenue stream and cost of goods sold for a given volume assumption. The Cash Flow Analysis section shown in FIG. 12 enables the user to review and analyze the cash requirements and net cash flow by month and cumulative over a selected period (such as a fiscal year, for example) for all approved projects within the selected product portfolio. As shown in FIG. 12, the cash flow information may be presented in graphical and/or in tabular format. The cash flow for each selected item may be shown, along with, for example, an indication of the project to which the selected item belongs and the approved/not approved status thereof. Similar tabular and graphical representations may be generated for ranking project proposals within a portfolio. The rankings may be based upon purely financial criteria such as Net Present Value (NPV); Internal Rate of Return, Payback Period and Investment Performance, for example. The rankings may also be generated using financial and non-financial criteria combined. For example, degree of market risk, degree of technical risk and alignment with the enterprise's strategic objectives, for example.

Executive Level Briefing

Another way to view selected project and product portfolios is shown in FIG. 8. FIG. 8 shows an executive-level summary of the proposed project and product portfolio. As shown, the view may include such exemplary items as a financial summary of the proposed portfolio, a manpower summary that summarizes the manpower needs of the proposed portfolio and the risks and sensitivities, in terms of Net Present Value (NPV), based upon selected assumptions. Conveniently, the executive summary may include a calculation of the worst-case scenario should all projects overrun to their predetermined maximum. A marketing summary may also be provided, by presenting tables of projects and products to provide a complete marketing summary to the user. A list of previously approved projects may advantageously be provided, to enable the decision maker to take the previously approved projects and their current financial requirements into account while reviewing the proposed projects and products shown in the executive level summary. The summary of FIG. 8, therefore, preferably spans financial, manpower, risk and marketing information and creates an executive level briefing that summarizes the entire portfolio in a single page.

Macro Level Resource Planning

Figure 14:
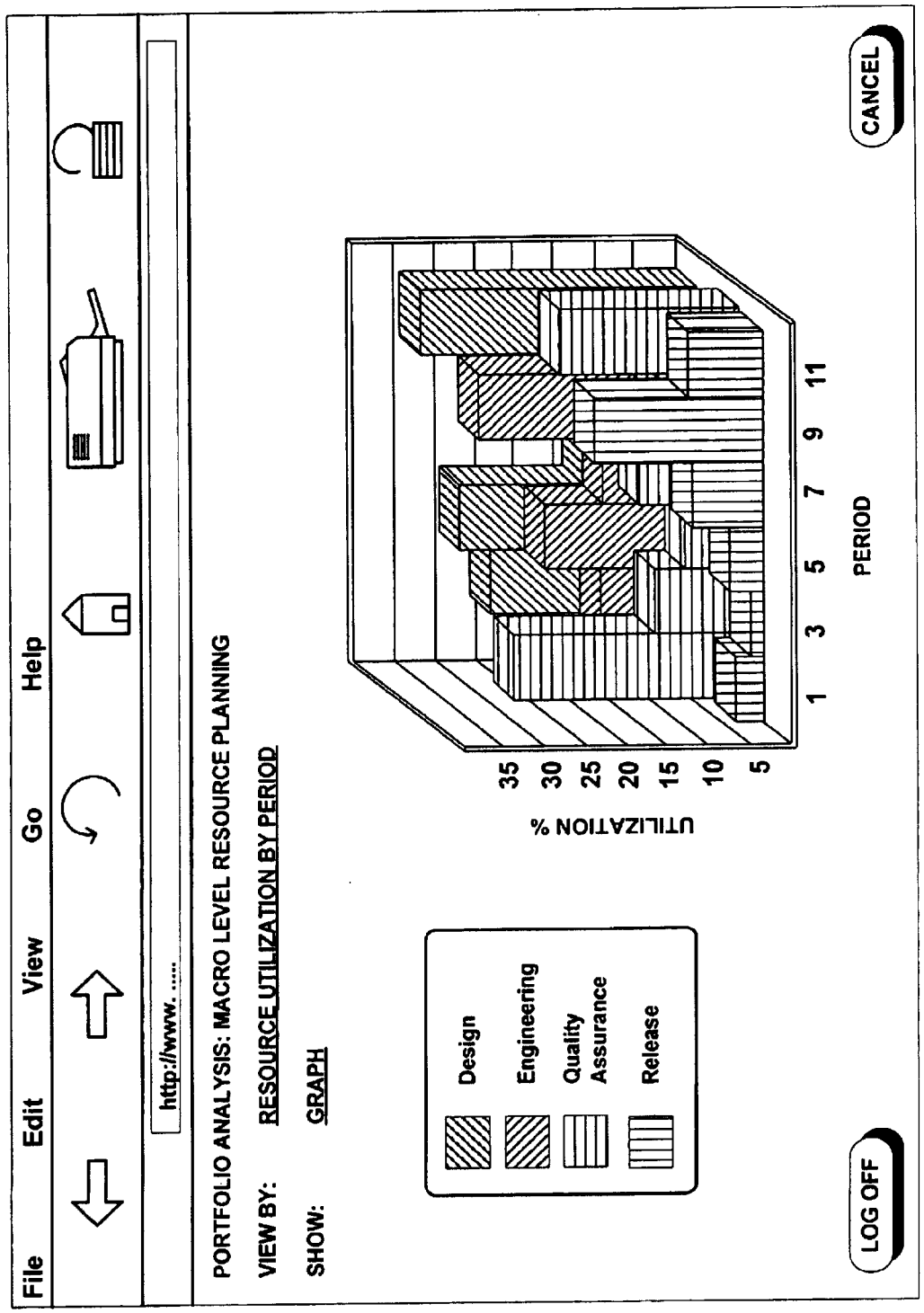
FIG. 14 shows an exemplary user interface that includes an exemplary graphical representation of resource utilization for a given project by period over different types of resources, according to an embodiment of the present invention.

Embodiments of the present invention enable the decision makers and those charged with reviewing project and product portfolios to visualize the usage of the enterprise's existing resources against the demands placed thereon by the project proposals. Therefore, the differential between the enterprise's existing resource base and the requirements of the proposal may also be visualized. For example, the aggregate requirements for resources of a given type may be visualized, in either a tabular or graphical format. FIG. 14 shows an exemplary graphical representation of resource utilization for a given project by period over resources of four different types. In this case, the illustrative resources shown are human resources, namely, design personnel, engineering personnel, quality assurance engineers and release personnel. Such information may also be presented by project phase, as embodiments of the present invention call for the collection of data relative to the proposed project's phases and the durations of such phases.

Figure 15:
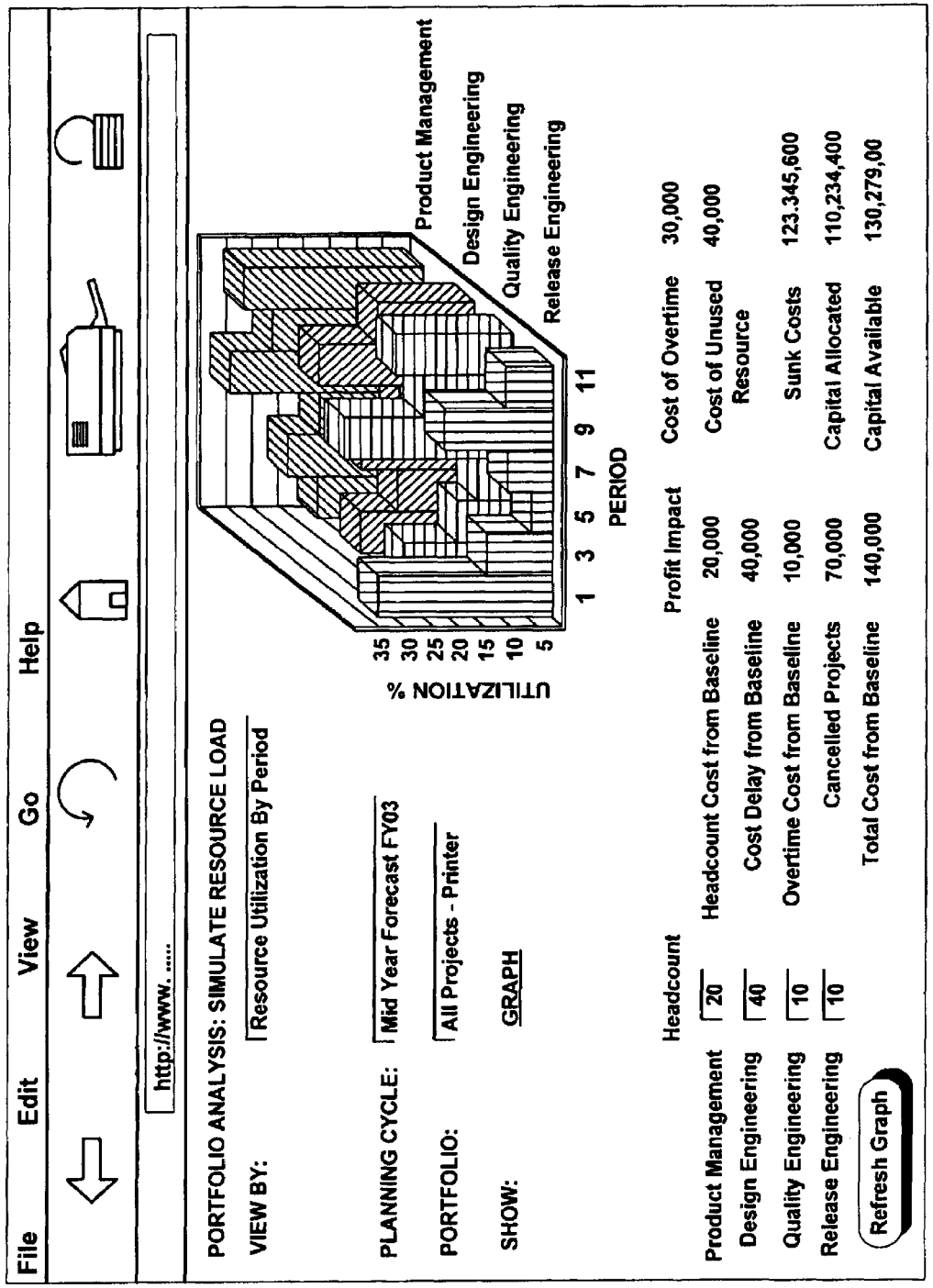
FIG. 15 shows an exemplary user interface that includes a graphical representation of simulated resource loads and availability for all or a selected subset of approved projects, by period, according to further embodiments of the present invention.

Embodiments of the present invention enable the user to visualize, as shown in FIG. 15, the resource loads and availability for all or a selected subset of approved projects, by period. The utilization rates of key resources may be shown. Similarly, the project start dates may be moved and the impact of such move charted against resource loading and/or the profitability of the project. As shown in FIG. 15, the headcount for different human resources may be changed and the resultant impact on the profit and costs visualized. For example, the headcount for Product Management, Design Engineering, Quality Engineering and Release Engineering may each be individually selected and the financial consequence of such changed headcount re-calculated. For example, the profit impact of such changes over a wide variety of profit metrics may be calculated, as may the cost of overtime, the cost of unused resources, the sunk costs, the capital already allocated and the remaining available capital, to identify a few possibilities. In this manner, the user may experiment with a variety of different funding, timing and resourcing scenarios to determine and select the optimal scenario that best fits the enterprise's strategic objectives, available resources, time window and available capital. The graphical representation of the resources by period shows potential peaks and troughs of personnel utilization over time in an intuitive manner. Such a graphical representation, coupled with the tabular representation of the headcount and profit impact enables decision makers to simulate and analyze various resource allocation situations to arrive at a revised scenario, without impacting the current plan of record.

Figure 16:
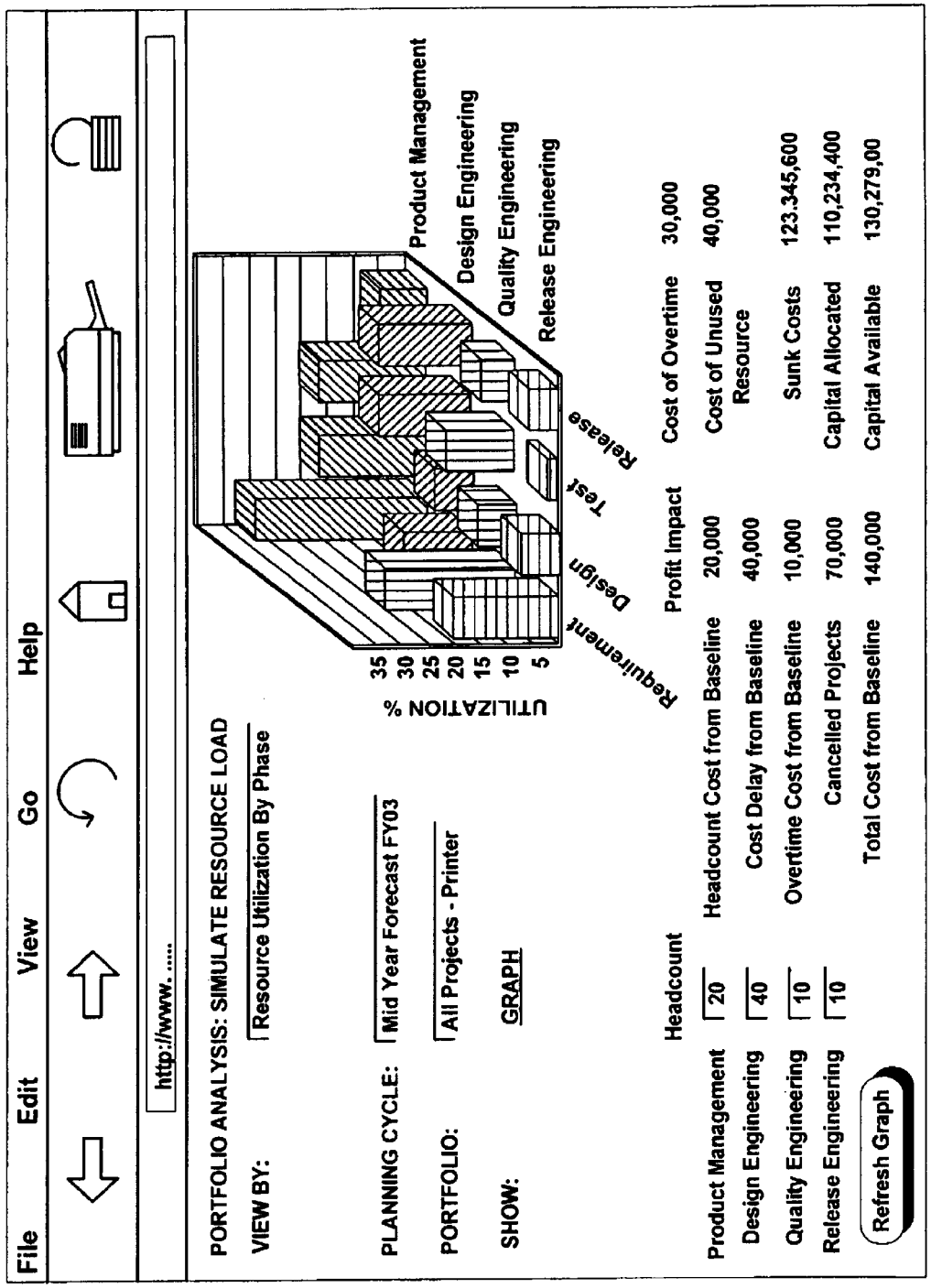
FIG. 16 shows an exemplary user interface that includes a graphical representation of projected resource utilization by project phase

FIG. 16 shows projected resource utilization by project phase. Embodiments of the present invention enable the user to simulate resource loading and also review resource utilization on a phase-by-phase basis for each resource type. In the same manner as shown and described relative to FIG. 15, the headcount of various human resource types may be varied at will and the resultant financial impact calculated. Once the user has achieved the perceived optimal resource load for the scenario under consideration, the scenario proposal may be submitted for executive review and approval.

Hardware Description

Figure 17:
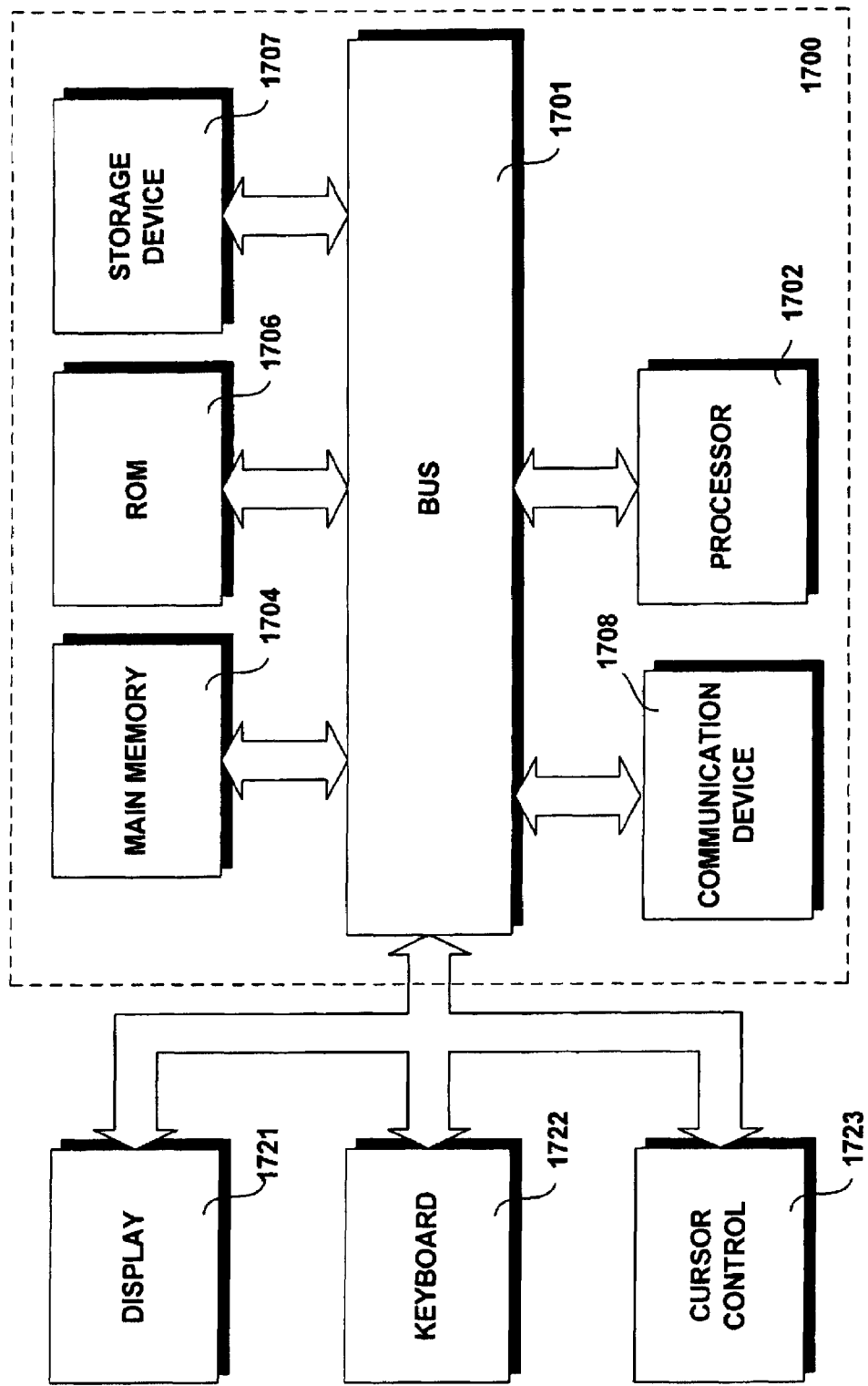
FIG. 17 is a block diagram of a computing device with which the methods of the present invention may be implemented.

FIG. 17 illustrates a block diagram of a computing device 1700 with which an embodiment of the present invention may be implemented. Computing device 1700 includes a bus 1701 or other communication mechanism for communicating information, and a processor 1702 coupled with bus 1701 for processing information. Computing device 1700 further comprises a random access memory (RAM) or other dynamic storage device 1704 (referred to as main memory), coupled to bus 1701 for storing information and instructions to be executed by processor 1702. Main memory 1704 also may be used for storing temporary variables or other intermediate information during execution of instructions by processor 1702. Computing device 1700 may also include a read only memory (ROM) and/or other static storage device 1706 coupled to bus 1701 for storing static information and instructions for processor 1702. A data storage device 1707, such as a magnetic disk or optical disk, may be coupled to bus 301 for storing information and instructions. A communication device 1708, such as a modem or network (such as Ethernet, for example) card is also coupled to the bus 301 to provide access to a network, such as the Internet, for example.

The computing device 1700 may also be coupled via bus 1701 to a display device 421 for displaying information to a computer user. An alphanumeric input device 1722, including alphanumeric and other keys, is typically coupled to bus 1701 for communicating information and command selections to processor 1702. Another type of user input device may be user's own voice or cursor control 1723, such as a mouse, a trackball, or cursor direction keys for communicating direction information and command selections to processor 1702 and for controlling cursor movement on display 1721.

The present invention is related to the use of computing device 1700 to enable the methods and systems for creating, managing and analyzing product and project portfolios as described and shown herein. According to one embodiment, the methods are carried out by one or more computing devices 1700 in response to processor(s) 1702 executing sequences of instructions contained in memory 1704. Such instructions may be read into memory 1704 from another computer-readable medium, such as data storage device 1707 and/or from a remotely located server. Execution of the sequences of instructions contained in memory 1704 causes processor(s) 1702 to implement the functionality described and shown herein. In alternative embodiments, hard-wired circuitry may be used in place of or in combination with software instructions to implement embodiments of the present invention. Thus, the present invention is not limited to any specific combination of hardware circuitry and software.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method of approving or disapproving a request for funding of a proposal within an enterprise over a computer network, the proposal including a plurality of characteristics, the method comprising:

launching over the computer network, via a first Web-based interface displayed on a computer, a business process for the request for funding of the proposal; and displaying, via a second Web-based interface displayed on a computer, information indicative of approval or disapproval of the request for funding of the proposal;

wherein the business process includes:

generating, at least one computer in a set of one or more computers, one or more Web-based setup interfaces that enable users to specify a set of assumptions required to complete the request for funding and a set of assumptions required to complete the proposal, receiving, at least one computer in a set of one or more computers, information specified by one or more users via the one or more Web-based setup interfaces displayed on one or more computers indicative of the set of assumptions required to complete the request for funding, receiving, at least one computer in a set of one or more computers, information specified by one or more users via the one or more Web-based setup interfaces displayed on one or more computers indicative of the set of assumptions required to complete the proposal, insuring, at least one computer in a set of one or more computers, that all assumptions required to complete the request for funding are stated, and insuring, at least one computer in the set of one or more computers, that all assumptions required to complete the proposal are stated;

wherein the business process, when all assumptions are stated, further includes:

selecting at least one computer in the set of one or more computers, based upon user input, one of a plurality of balanced scorecards generated using one or more balanced scorecard techniques that assign weights to strategic criteria associated with a balanced scorecard dependent of how well a given proposal satisfies the strategic criteria of the balanced scorecard, each of the plurality of balanced scorecards defining:

a plurality of strategic criteria associated with the balanced scorecard, and a weighting value for each one of the plurality of strategic criteria associated with the balanced scorecard against which to evaluate the given proposal;

creating at least one computer in the set of one or more computers, based upon user input, a plurality of different scenarios for the proposal, each of the plurality of different scenarios setting a different value for at least one of the plurality of characteristics;

forwarding over the computer network, using at least one computer in the set of one or more computers, information configured to generate a user interface enabling users to evaluate each of the plurality of different scenarios against the selected balanced scorecard;

selecting at least one computer in the set of one or more computers, based upon user input received via the user interface enabling users to evaluate each of the plurality of different scenarios against the selected balanced scorecard, one of the plurality of different scenarios according to information received at the at least one computer in the set of computer system in response to the evaluation thereof against the selected balanced scorecard;

configuring at least one computer in the set of one or more computers the proposal according to the selected one of the plurality of different scenarios;

forwarding over the computer network, using at least one computer in the set of one or more computers, a request for funding of the configured proposal to a financial approver for the enterprise;

forwarding over the computer network, using at least one computer in the set of one or more computers, information to the financial approver for the enterprise requesting approval of the requested funding from the financial approver;

forwarding over the computer network, using at least one computer in the set of one or more computers, the configured proposal to a technological approver for the enterprise;

forwarding over the computer network, using at least one computer in the set of one or more computers, information to the technological approver requesting technological approval of the configured proposal from the technological approver;

forwarding over the computer network, using at least one computer in the set of one or more computers, the configured proposal to a marketing approver for the enterprise;

forwarding over the computer network, using at least one computer in the set of one or more computers, information requesting marketing approval of the configured proposal from the marketing approver;

generating information at least one computer in the set of one or more computers disapproving the request for funding if requesting approval from any of the approvers is unsuccessful; and generating information approving the request for funding if requesting approval from each of the approvers is successful.

2. The computer-implemented method of claim 1, wherein forwarding over the computer network, using the at least one computer in the set of one or more computers, information to the financial approver for the enterprise requesting approval of the requested funding from the financial approver includes at least one of:

forwarding over the computer network, using at least one computer in the set of one or more computers, information requesting a determination of a risk of the requested funding;

forwarding over the computer network, using at least one computer in the set of one or more computers, information requesting a determination of a potential profitability of the proposal; and forwarding over the computer network, using at least one computer in the set of one or more computers, information requesting a determination of an availability of funds for the proposal.

3. The computer-implemented method of claim 2, wherein the business process further includes:

accepting an approval of the request for funding from the financial approver at at least one computer in the set of one or more computers;

wherein the approval of the request for funding from the financial approver is accepted when information is received at the at least one computer system indicating that the risk and the potential profitability are determined by the financial approver to be acceptable, and when information is received at the at least one computer system indicating that the funds are determined by the financial approver to be available for the proposal.

4. The computer-implemented method of claim 1, wherein forwarding over the computer network, using the at least one computer in the set of one or more computers, information to the technological approver requesting technological approval of the configured proposal from the technological approver includes at least one of:

forwarding over the computer network, using at least one computer in the set of one or more computers, information requesting a determination of technological risks of the proposal, and forwarding over the computer network, using at least one computer in the set of one or more computers, information requesting a determination of a strategic fit of a technology of the proposal to a technological strategy of the enterprise.

5. The computer-implemented method of claim 4, wherein the business process further includes:

accepting an approval of the configured proposal from the technological approver at at least one computer in the set of one or more computers;

wherein the approval of the configured proposal from the technological approver is accepted when information is received at the at least one computer in the set of one or more computers indicating that the technological risks are determined by the technological approver to be acceptable, and when information is received at the at least one computer in the set of one or more computers indicating that the configured proposal is determined by the technological approver to fit within the technological strategy of the enterprise.

6. The computer-implemented method of claim 1, wherein forwarding over the computer network, using the at least one computer in the set of one or more computers, information to the marketing approver requesting marketing approval of the configured proposal from the marketing approver includes at least one of:

forwarding over the computer network, using at least one computer in the set of one or more computers, information requesting a determination of a market risk of the proposal; and forwarding over the computer network, using at least one computer in the set of one or more computers, information requesting a determination of the portfolio fit of the proposal within a predetermined or new portfolio of the enterprise.

7. The computer-implemented method of claim 6, wherein the business process further including:

accepting an approval of the configured proposal from the marketing approver at at least one computer in the set of one or more computers;

wherein the approval of the configured proposal from the marketing approver is accepted when information is received at the at least one computer in the set of one or more computers indicating that the market risk is determined by the marketing approver to be acceptable, and information is received at the at least one computer in the set of one or more computers indicating that the configured proposal is determined by the marketing approver to fit within the predetermined or new portfolio.

8. The computer-implemented method of claim 1, wherein the proposal includes a project proposal.

9. The computer-implemented method of claim 1, wherein the proposal includes a product proposal.

10. A computer system for obtaining an approval or a disapproval of a request for funding of a proposal within an enterprise, the proposal including a plurality of characteristics, the computer system comprising:

at least one processor;

at least one data storage device;

a plurality of processes spawned by said at least one processor, the processes including processing logic for:

launching a business process for the request for funding of the proposal; and generating information indicative of the approval or disapproval of the request for funding of the proposal;

wherein the business process includes:

generating one or more Web-based setup interfaces that enable users to specify a set of assumptions required to complete the request for funding and a set of assumptions required to complete the proposal, receiving information specified by one or more users via the one or more Web-based setup interfaces indicative of the set of assumptions required to complete the request for funding, receiving information specified by one or more users via the one or more Web-based setup interfaces indicative of the set of assumptions required to complete the proposal, insuring that all assumptions required to complete the request for funding are stated, and insuring that all assumptions required to complete the proposal are stated;

wherein the business process, when all assumptions are stated, further includes:

selecting, based upon user input, one of a plurality of balanced scorecards generated using one or more balanced scorecard techniques that assign weights to strategic criteria associated with a balanced scorecard dependent of how well a given proposal satisfies the strategic criteria of the balanced scorecard, each of the plurality of balanced scorecards defining:

a plurality of strategic criteria against associated with the balanced scorecard, and a weighting value for each of the plurality of strategic criteria associated with the balanced scorecard against which to evaluate the given proposal;

creating, based upon user input, a plurality of different scenarios for the proposal, each of the plurality of different scenarios setting a different value for at least one of the plurality of characteristics;

forwarding information configured to generate a user interface enabling users to evaluate each of the plurality of different scenarios against the selected balanced scorecard;

selecting, based upon user input received via the user interface enabling users to evaluate each of the plurality of different scenarios against the selected balanced scorecard, one of the plurality of different scenarios according to information received in response to the evaluation thereof against the selected balanced scorecard;

configuring the proposal according to the selected one of the plurality of different scenarios;

forwarding a request for funding of the configured proposal to a financial approver for the enterprise;

forwarding information to the financial approver for the enterprise requesting approval of the requested funding from the financial approver;

forwarding the configured proposal to a technological approver for the enterprise;

forwarding information to the technological approver requesting technological approval of the configured proposal from the technological approver;

forwarding the configured proposal to a marketing approver for the enterprise;

forwarding information to the marketing approver requesting marketing approval of the configured proposal from the marketing approver;

generating information disapproving the request for funding if requesting approval from any of the approvers is unsuccessful; and generating information approving the request for funding if requesting approval from each of the approvers is successful.

11. The computer system of claim 10, wherein forwarding information to the financial approver for the enterprise requesting approval of the requested funding from the financial approver includes at least one of:

forwarding information to the financial approver requesting a determination of a risk of the requested funding;

forwarding information to the financial approver requesting a determination of a potential profitability of the proposal; and forwarding information to the financial approver requesting a determination of an availability of funds for the proposal.

12. The computer system of claim 11, wherein the business process further includes:

accepting an approval of the request for funding from the financial approver;

wherein the approval of the request for funding from the financial approver is accepted when information is received indicating that the risk and the potential profitability are determined by the financial approver to be acceptable, and when information is received indicating that the funds are determined to be available for the proposal.

13. The computer system of claim 10, wherein forwarding information to the technological approver requesting technological approval of the configured proposal from the technological approver includes at least one of:

forwarding information to the technological approver requesting a determination of technological risks of the proposal; and forwarding information to the technological approver requesting a determination of a strategic fit of a technology of the proposal to a technological strategy of the enterprise.

14. The computer system of claim 13, wherein the business process further includes:

accepting an approval of the configured proposal from the technological approver;

wherein the approval of the configured proposal from the technological approver is accepted when information is received indicating that the technological risks are determined by the technological approver to be acceptable, and when information is received indicating that the configured proposal is determined by the technological approver to fit within the technological strategy of the enterprise.

15. The computer system of claim 10, wherein forwarding information to the marketing approver requesting marketing approval of the configured proposal from the marketing approver includes at least one of:

forwarding information to the marketing approver requesting a determination of a market risk of the proposal; and forwarding information to the marketing approver requesting a determination of the portfolio fit of the proposal within a predetermined or new portfolio of the enterprise.

16. The computer system of claim 10, wherein the business process further includes:

accepting an approval of the configured proposal from the marketing approver;

wherein the approval of the configured proposal from the marketing approver is accepted when information is received indicating that the market risk is determined by the marketing approver to be acceptable, and information is received indicating that the configured proposal is determined by the marketing approver to fit within the predetermined or new portfolio.

17. The computer system of claim 10, wherein the proposal includes a project proposal.

18. The computer system of claim 10, wherein the proposal includes a product proposal.

19. A machine-readable storage medium having data stored thereon representing sequences of instructions which, when executed by a computing device, causes said computing device to obtain an approval or a disapproval of a request for funding of a proposal within an enterprise, the proposal including a plurality of characteristics, the machine-readable storage medium comprising:

instructions for spawning a plurality of processes by said computing device, the processes including processing logic for:

launching a business process for the request for funding of the proposal; and generating information indicative of the approval or disapproval of the request for funding of the proposal;

wherein the business process includes:

generating one or more Web-based setup interfaces that enable users to specify a set of assumptions required to complete the request for funding and a set of assumptions required to complete the proposal, receiving information specified by one or more users via the one or more Web-based setup interfaces displayed on one or more computers indicative of the set of assumptions required to complete the request for funding, receiving information specified by one or more users via the one or more Web-based setup interfaces displayed on one or more computers indicative of the set of assumptions required to complete the proposal, insuring that all assumptions required to complete time request for funding are stated, and insuring that all assumptions required to complete the proposal are stated;

wherein the business process, when all assumptions are stated, further includes:
  selecting, based upon user input, one of a plurality of balanced scorecards generated using one or more balanced scorecard techniques that assign weights to strategic criteria associated with a balanced scorecard dependent of how well a given proposal satisfies the strategic criteria of the balanced scorecard, each of the plurality of balanced scorecards defining:
    a plurality of strategic criteria against associated with the balanced scorecard, and
    a weighting value for each of the plurality of strategic criteria associated with the balanced scorecard against which to evaluate the given proposal;
  creating, based upon user input, a plurality of different scenarios for the proposal, each of the plurality of different scenarios setting a different value for at least one of the plurality of characteristics;
  forwarding information configured to generate a user interface enabling users to evaluate each of the plurality of different scenarios against the selected balanced scorecard;
  selecting, based upon user input received via the user interface enabling users to evaluate each of the plurality of different scenarios against the selected balanced scorecard, one of the plurality of different scenarios according to information received in response to the evaluation thereof against the selected balanced scorecard;
  configuring the proposal according to the selected one of the plurality of different scenarios;
  forwarding a request for funding of the configured proposal to a financial approver for the enterprise;
  forwarding information to the financial approver for the enterprise requesting approval of the requested funding from the financial approver;
  forwarding the configured proposal to a technological approver for the enterprise;
  forwarding information to the technological approver requesting technological approval of the configured proposal from the technological approver;
  forwarding the configured proposal to a marketing approver for the enterprise;
  forwarding information to the marketing approver requesting marketing approval of the configured proposal from the marketing approver;
  generating information disapproving the request for funding if requesting approval from any of the approvers is unsuccessful; and
  generating information approving the request for funding if requesting approval from each of the approvers is successful.

20. The machine-readable storage medium of claim 19, wherein forwarding information to the financial approver for the enterprise requesting approval of the requested funding from the financial approver includes at least one of:
  forwarding information to the financial approver requesting a determination of a risk of the requested funding;
  forwarding information to the financial approver requesting a determination of a potential profitability of the proposal; and
  forwarding information to the financial approver requesting a determination of an availability of funds for the proposal.

21. The machine-readable storage medium of claim 20, wherein the business process further includes:
  accepting an approval of the request for funding from the financial approver;
  wherein the approval of the request for funding from the financial approver is accepted when information is received indicating that the risk and the potential profitability are determined by the financial approver to be acceptable, and when information is received indicating that the funds are determined to be available for the proposal.

22. The machine-readable storage medium of claim 19, wherein forwarding information to the technological approver requesting technological approval of the configured proposal from the technological approver includes at least one of:
  forwarding information to the technological approver requesting a determination of technological risks of the proposal; and
  forwarding information to the technological approver requesting a determination of a strategic fit of a technology of the proposal to a technological strategy of the enterprise.

23. The machine-readable storage medium of claim 22, wherein the business process further includes:
  accepting an approval of the configured proposal from the technological approver;
  wherein the approval of the configured proposal from the technological approver is accepted when information is received indicating that the technological risks are determined by the technological approver to be acceptable, and when information is received indicating that the configured proposal is determined by the technological approver to fit within the technological strategy of the enterprise.

24. The machine-readable storage medium of claim 19, wherein forwarding information to the marketing approver requesting marketing approval of the configured proposal from the marketing approver includes at least one of:
  forwarding information to the marketing approver requesting a determination of a market risk of the proposal; and
  forwarding information to the marketing approver requesting a determination of the portfolio fit of the proposal within a predetermined or new portfolio of the enterprise.

25. The machine-readable storage medium of claim 19, wherein the business process further includes:
  accepting an approval of the configured proposal from the marketing approver;
  wherein the approval of the configured proposal from the marketing approver is accepted when information is received indicating that the market risk is determined by the marketing approver to be acceptable, and information is received indicating that the configured proposal is determined by the marketing approver to fit within the predetermined or new portfolio.

26. The machine-readable storage medium of claim 19, wherein the proposal includes a project proposal.

27. The machine-readable storage medium of claim 19, wherein the proposal includes a product proposal.

* * * * *

UNITED STATES PATENT AND TRADEMARK OFFICE
CERTIFICATE OF CORRECTION

PATENT NO. : 7,664,664 B2  Page 1 of 2
APPLICATION NO. : 10/422390
DATED : February 16, 2010
INVENTOR(S) : Nigel King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1734 days.

On Title page 2, in column 2, under Item [56] "Other Publications", line 26, delete "systems",Decision" and insert -- systems", Decision --, therefor.

On Title page 2, in column 2, under Item [56] "Other Publications", line 35, delete "Performand"," and insert -- Performance", --, therefor.

In column 3, line 16, after "phase" insert -- . --.

In column 11, line 34, after "FIG. 9" insert -- . --.

In column 21, line 28, in claim 1, before "at least" insert -- at --.

In column 21, line 33, in claim 1, before "at least" insert -- at --.

In column 21, line 39, in claim 1, before "at least" insert -- at --.

In column 21, line 44, in claim 1, before "at least" insert -- at --.

In column 21, line 47, in claim 1, before "at least" insert -- at --.

In column 21, line 52, in claim 1, before "at least" insert -- at --.

In column 21, line 66, in claim 1, before "at least" insert -- at --.

Signed and Sealed this

Nineteenth Day of October, 2010

David J. Kappos
*Director of the United States Patent and Trademark Office*

CERTIFICATE OF CORRECTION (continued)
U.S. Pat. No. 7,664,664 B2

In column 22, line 11, in claim 1, before "at least" insert -- at --.

In column 22, line 20, in claim 1, before "at least" insert -- at --.

In column 22, line 50, in claim 1, before "at least" insert -- at --.